US007403922B1

(12) United States Patent
Lewis et al.

(10) Patent No.: US 7,403,922 B1
(45) Date of Patent: Jul. 22, 2008

(54) METHOD AND APPARATUS FOR EVALUATING FRAUD RISK IN AN ELECTRONIC COMMERCE TRANSACTION

(75) Inventors: Michael Lewis, Sunnyvale, CA (US);
Frank King, Saratoga, CA (US);
Thomas Arnold, Saratoga, CA (US);
William Wright, Los Gatos, CA (US);
John Pettit, Sausalito, CA (US)

(73) Assignee: Cybersource Corporation, Mountain View, CA (US)

( * ) Notice: Subject to any disclaimer, the term of this patent is extended or adjusted under 35 U.S.C. 154(b) by 1095 days.

(21) Appl. No.: 09/708,124

(22) Filed: Nov. 2, 2000

Related U.S. Application Data

(63) Continuation-in-part of application No. 09/442,106, filed on Nov. 17, 1999, which is a continuation of application No. 08/901,687, filed on Jul. 28, 1997, now Pat. No. 6,029,154.

(51) Int. Cl.
*G06Q 40/00* (2006.01)
(52) U.S. Cl. .............................. 705/38; 705/35; 705/39
(58) Field of Classification Search .................. 705/38, 705/57, 67, 72, 80, 18, 26, 42, 44, 35, 39
See application file for complete search history.

(56) References Cited

U.S. PATENT DOCUMENTS 3,657,702 A 4/1972 Stephenson, Jr.

(Continued)

FOREIGN PATENT DOCUMENTS

EP 0598469 A2 5/1994

(Continued)

OTHER PUBLICATIONS

Eric Bodner, et al., "An Internet Billing Server: Availability, Reliability & Scalability Issues in the MS4 Billing Server Design & Prototype", pp. 1-20, Carnegie Mellon University, Information Networking Institute, A Thesis submitted to the Information Networking Institute in Partial Fulfillment of the Requirements for the Degree, undated.

(Continued)

*Primary Examiner*—Jagdish N Patel
(74) *Attorney, Agent, or Firm*—Hickman Palermo Truong & Becker LLP; Christopher J. Palmero

(57) ABSTRACT

A technique for evaluating fraud risk in e-commerce transactions between consumer and a merchant is disclosed. The merchant requests service from the system using a secure, open messaging protocol. An e-commerce transaction or electronic purchase order is received from the merchant, the level of risk associated with each order is measured, and a risk score is returned. In one embodiment, data validation, highly predictive artificial intelligence pattern matching, network data aggregation and negative file checks are used. The system performs analysis including data integrity checks and correlation analyses based on characteristics of the transaction. Other analysis includes comparison of the current transaction against known fraudulent transactions, and a search of a transaction history database to identify abnormal patterns, name and address changes, and defrauders. In one alternative, scoring algorithms are refined through use of a closed-loop risk modeling process enabling the service to adapt to new or changing fraud patterns.

24 Claims, 14 Drawing Sheets

U.S. PATENT DOCUMENTS

| | | | |
|---|---|---|---|
| 3,950,733 A | 4/1976 | Cooper et al. | |
| 4,044,243 A | 8/1977 | Cooper et al. | |
| 4,254,474 A | 3/1981 | Cooper et al. | |
| RE30,579 E | 4/1981 | Goldman et al. | |
| RE30,580 E | 4/1981 | Goldman et al. | |
| 4,305,059 A | 12/1981 | Benton | |
| 4,326,259 A | 4/1982 | Cooper et al. | |
| 4,485,300 A | 11/1984 | Peirce | |
| 4,510,382 A | 4/1985 | Walter | |
| 4,528,643 A | 7/1985 | Freeny, Jr. | |
| 4,578,530 A | 3/1986 | Zeidler | |
| 4,594,663 A | 6/1986 | Nagata et al. | |
| 4,734,564 A | 3/1988 | Boston et al. | |
| 4,734,858 A | 3/1988 | Schlafly | |
| 4,755,935 A | 7/1988 | Davis et al. | |
| 4,755,940 A | 7/1988 | Brachtl et al. | |
| 4,760,604 A | 7/1988 | Cooper et al. | |
| 4,792,968 A | 12/1988 | Katz | |
| 4,795,890 A | 1/1989 | Goldman | |
| 4,799,156 A | 1/1989 | Shavit et al. | |
| 4,812,628 A | 3/1989 | Boston et al. | |
| 4,827,508 A | 5/1989 | Shear | |
| 4,845,739 A | 7/1989 | Katz | |
| 4,893,330 A | 1/1990 | Franco | |
| 4,897,811 A | 1/1990 | Scofield | |
| 4,922,521 A | 5/1990 | Krikke et al. | |
| 4,935,870 A | 6/1990 | Burk, Jr. et al. | |
| 4,947,028 A | 8/1990 | Garog | |
| 4,949,257 A | 8/1990 | Orbach | |
| 4,958,375 A | 9/1990 | Reilly | |
| 4,977,595 A | 12/1990 | Ohta et al. | |
| 4,982,346 A | 1/1991 | Girouard et al. | |
| 4,992,940 A | 2/1991 | Dworkin | |
| 5,025,373 A | 6/1991 | Keyser, Jr. et al. | |
| 5,060,153 A | 10/1991 | Nakagawa | |
| 5,077,607 A | 12/1991 | Johnson et al. | |
| 5,175,682 A | 12/1992 | Higashiyama et al. | |
| 5,177,342 A | 1/1993 | Adams | |
| 5,206,488 A | 4/1993 | Teicher | |
| 5,220,501 A | 6/1993 | Lawlor et al. | |
| 5,231,570 A | 7/1993 | Lee | |
| 5,245,657 A * | 9/1993 | Sakurai | 705/67 |
| 5,247,575 A | 9/1993 | Sprague et al. | |
| 5,253,341 A | 10/1993 | Rozmanith et al. | |
| 5,255,342 A | 10/1993 | Nitta | |
| 5,291,550 A | 3/1994 | Levy et al. | |
| 5,305,195 A | 4/1994 | Murphy | |
| 5,311,594 A | 5/1994 | Penzias | |
| 5,321,751 A | 6/1994 | Ray et al. | |
| 5,335,265 A | 8/1994 | Cooper et al. | |
| 5,336,870 A | 8/1994 | Hughes et al. | |
| 5,341,429 A | 8/1994 | Stringer et al. | |
| 5,347,632 A | 9/1994 | Filepp et al. | |
| 5,351,186 A | 9/1994 | Bullock et al. | |
| 5,351,293 A | 9/1994 | Michener et al. | |
| 5,351,296 A | 9/1994 | Sullivan | |
| 5,377,269 A | 12/1994 | Heptig et al. | |
| 5,383,113 A | 1/1995 | Kight et al. | |
| 5,386,104 A | 1/1995 | Sime | |
| 5,398,300 A | 3/1995 | Levey | |
| 5,410,138 A * | 4/1995 | Martin | 235/449 |
| 5,414,833 A | 5/1995 | Hershey et al. | |
| 5,420,405 A | 5/1995 | Chasek | |
| 5,436,971 A * | 7/1995 | Armbrust et al. | 705/67 |
| 5,471,627 A | 11/1995 | Means et al. | |
| 5,475,585 A | 12/1995 | Bush | |
| 5,479,574 A | 12/1995 | Glier et al. | |
| 5,491,817 A | 2/1996 | Gopal et al. | |
| 5,495,521 A * | 2/1996 | Rangachar | 379/93.04 |
| 5,500,513 A | 3/1996 | Langhans et al. | |
| 5,511,122 A | 4/1996 | Atkinson | |
| 5,515,307 A | 5/1996 | Aiello et al. | |
| 5,530,438 A | 6/1996 | Bickham et al. | |
| 5,542,054 A | 7/1996 | Batten, Jr. | |
| 5,557,518 A | 9/1996 | Rosen | |
| 5,590,197 A | 12/1996 | Chen et al. | |
| 5,596,642 A | 1/1997 | Davis et al. | |
| 5,596,643 A | 1/1997 | Davis et al. | |
| 5,604,802 A | 2/1997 | Holloway | |
| 5,608,801 A | 3/1997 | Aiello et al. | |
| 5,621,797 A | 4/1997 | Rosen | |
| 5,623,547 A | 4/1997 | Jones et al. | |
| 5,627,886 A * | 5/1997 | Bowman | 379/111 |
| 5,627,972 A | 5/1997 | Shear | |
| 5,629,982 A | 5/1997 | Micali | |
| 5,642,419 A | 6/1997 | Rosen | |
| 5,646,998 A * | 7/1997 | Stambler | 705/76 |
| 5,671,280 A | 9/1997 | Rosen | |
| 5,675,713 A | 10/1997 | Batten, Jr. | |
| 5,680,511 A * | 10/1997 | Baker et al. | 704/257 |
| 5,696,907 A | 12/1997 | Tom | |
| 5,696,909 A | 12/1997 | Wallner | |
| 5,701,398 A | 12/1997 | Glier et al. | |
| 5,703,949 A | 12/1997 | Rosen | |
| 5,704,018 A | 12/1997 | Heckerman et al. | |
| 5,708,422 A | 1/1998 | Blonder et al. | |
| 5,710,887 A | 1/1998 | Chelliah et al. | |
| 5,715,314 A | 2/1998 | Payne et al. | |
| 5,724,424 A | 3/1998 | Gifford | |
| 5,729,594 A | 3/1998 | Klingman | |
| 5,732,400 A | 3/1998 | Mandler | |
| 5,745,654 A | 4/1998 | Titan | |
| 5,757,917 A | 5/1998 | Rose et al. | |
| 5,758,327 A | 5/1998 | Gardner et al. | |
| 5,768,478 A | 6/1998 | Batten, Jr. | |
| 5,790,645 A | 8/1998 | Fawcett et al. | |
| 5,793,302 A * | 8/1998 | Stambler | 340/5.86 |
| 5,802,256 A | 9/1998 | Heckerman et al. | |
| 5,802,497 A | 9/1998 | Manasse | |
| 5,805,686 A | 9/1998 | Moller et al. | |
| 5,809,144 A | 9/1998 | Sirbu et al. | |
| 5,812,668 A | 9/1998 | Weber | |
| 5,815,657 A | 9/1998 | Williams et al. | |
| 5,819,226 A * | 10/1998 | Gopinathan et al. | 705/44 |
| 5,822,737 A | 10/1998 | Ogram | |
| 5,826,245 A | 10/1998 | Sandberg-Diment | |
| 5,832,465 A | 11/1998 | Tom | |
| 5,850,442 A | 12/1998 | Muftic | |
| 5,862,224 A * | 1/1999 | Gilbert et al. | 380/28 |
| 5,870,473 A | 2/1999 | Boesch et al. | |
| 5,875,236 A | 2/1999 | Jankowitz et al. | |
| 5,877,482 A * | 3/1999 | Reilly | 235/380 |
| 5,878,139 A | 3/1999 | Rosen | |
| 5,878,337 A | 3/1999 | Joao et al. | |
| 5,884,289 A * | 3/1999 | Anderson et al. | 705/44 |
| 5,897,621 A | 4/1999 | Boesch et al. | |
| 5,899,980 A | 5/1999 | Wilf et al. | |
| 5,905,736 A | 5/1999 | Ronen et al. | |
| 5,910,988 A * | 6/1999 | Ballard | 705/75 |
| 5,936,541 A * | 8/1999 | Stambler | 340/5.22 |
| 5,940,529 A | 8/1999 | Buckley | |
| 5,953,710 A | 9/1999 | Fleming | |
| 5,970,129 A * | 10/1999 | Asfar et al. | 379/144.01 |
| 5,970,469 A * | 10/1999 | Scroggie et al. | 705/14 |
| 5,974,148 A * | 10/1999 | Stambler | 705/75 |
| 5,988,497 A * | 11/1999 | Wallace | 235/382.5 |
| 5,995,604 A * | 11/1999 | Chan et al. | 379/145 |
| 6,000,608 A | 12/1999 | Dorf | |
| 6,012,042 A * | 1/2000 | Black et al. | 705/36 |
| 6,018,723 A * | 1/2000 | Siegel et al. | 705/38 |
| 6,029,154 A | 2/2000 | Pettitt | |
| 6,032,137 A * | 2/2000 | Ballard | 705/75 |
| 6,061,791 A * | 5/2000 | Moreau | 713/171 |
| 6,067,535 A * | 5/2000 | Hobson et al. | 706/10 |

| | | | |
|---|---|---|---|
| 6,068,184 A * | 5/2000 | Barnett | 235/379 |
| 6,078,904 A | 6/2000 | Rebane | |
| 6,094,643 A * | 7/2000 | Anderson et al. | 705/44 |
| 6,119,103 A * | 9/2000 | Basch et al. | 705/35 |
| 6,119,227 A * | 9/2000 | Mao | 713/171 |
| 6,125,445 A * | 9/2000 | Arditti et al. | 713/169 |
| 6,163,604 A * | 12/2000 | Baulier et al. | 379/189 |
| 6,182,070 B1 | 1/2001 | Megiddo et al. | |
| 6,189,005 B1 | 2/2001 | Chakrabarti et al. | |
| 6,278,997 B1 | 8/2001 | Agrawal et al. | |
| 6,330,546 B1 | 12/2001 | Gopinathan et al. | |
| 6,336,108 B1 | 1/2002 | Thiesson et al. | |
| 6,345,265 B1 | 2/2002 | Thiesson et al. | |
| 6,363,488 B1 | 3/2002 | Ginter et al. | |
| 6,389,402 B1 | 5/2002 | Ginter et al. | |
| 6,405,179 B1 | 6/2002 | Rebane | |
| 6,418,436 B1 * | 7/2002 | Degen et al. | 707/6 |
| 6,430,539 B1 | 8/2002 | Lazarus et al. | |
| 6,516,056 B1 * | 2/2003 | Justice et al. | 379/145 |
| 6,529,888 B1 | 3/2003 | Heckerman et al. | |
| 6,536,037 B1 | 3/2003 | Guheen et al. | |
| 6,609,118 B1 | 8/2003 | Khedkar et al. | |
| 6,611,598 B1 * | 8/2003 | Hayosh | 380/54 |
| 6,629,081 B1 | 9/2003 | Cornelius et al. | |
| 6,714,918 B2 * | 3/2004 | Hillmer et al. | 705/18 |
| 7,069,234 B1 | 6/2006 | Cornelius et al. | |
| 7,089,428 B2 | 8/2006 | Farley et al. | |
| 7,167,844 B1 | 1/2007 | Leong et al. | |
| 2001/0029496 A1 | 10/2001 | Otto et al. | |
| 2002/0078381 A1 | 6/2002 | Farley et al. | |
| 2003/0023543 A1 | 1/2003 | Gunewardena et al. | |
| 2003/0097292 A1 | 5/2003 | Chen et al. | |

FOREIGN PATENT DOCUMENTS

| | | |
|---|---|---|
| GB | 2189741 A * | 11/1987 |
| GB | 2312963 A * | 11/1997 |
| JP | H07-78165 A1 | 3/1995 |
| JP | H08-504284 A1 | 5/1996 |
| JP | H11-259571 A1 | 9/1999 |
| JP | H11-32818 A1 | 11/1999 |
| WO | WO 96/31043 | 10/1996 |

OTHER PUBLICATIONS

Eric Bodner, et al., "An Internet Billing Server: Analysis of Distributed Computing and Cross Platform Issues", pp. 1-20, Carnegie Mellon University, Information Networking Institute, A Thesis submitted to the Information Networking Institute in Partial Fulfillment of the Requirements for the Degree, undated.
D. W. Davies, et al., "Security for Computer Networks, An Introduction to Data Security in Teleprocessing and Electronic Funds Transfer", 1984, pp. 1-385.
S.P. Miller, et al., "Kerberos Authentication and Authorization System", Oct. 27, 1998, Section E.2.1, pp. 1-21.
Lennart Jansson, "General Electronic Payment System", 1985, pp. 832-837, 8th Proceedings of the International Conference on Computer Communication.
Richard Batelaan, et al., "An Internet Billing Server: System Requirements", A Thesis submitted to the Information Networking Institute in Partial Fulfillment of the Requirements for the degree, pp. 1-130, undated.
Danny Cohen, "Electronic Commerce", Oct. 1989, ISI Research Report, ISI/RR-89-244, pp. 1-42.
Danny Cohen, "Computerized Commerce", Sep. 1, 1989, ISI Reprint Series, IRI/RS-89-243, pp. 1095, Preprinted from Information Processing 89, Proceedings of the IFIP World Computer Congress, held Aug. 28-Sep. 1, 1989, in San Francisco.
Richard Batelaan, et al., "An Internet Billing Server Prototype Design", Aug. 10, 1992, pp. 1-97, Carnegie Mellon University, Information Networking Institute, 1992 Final Project.
CyberSource, "CyberSource Enhances Internet Fraud Screen to Combat Credit Card Fraud," http://www.cybersource.com/press_room/view.xml?page_id=579, printed Apr. 23, 2002, 3 pages.
CyberSource, "CyberSource Introduces Credit Card Authorization Service Enhanced with a Powerful Fraud Screening Tool," http://www.cybersource.com/press_room/view.xml?page_id=237, printed Apr. 23, 2002, 2 pages.
Techmall, "Meridien Launches New e*Payments Research Service Identifying Web Opportunities And Risk For Retailers And Financial Firms," http://www8/techmall.com/techdocs/TS991202-1.html, printed Apr. 23, 2002, 2 pages.
DataCash, "Payment card fraud checking service for e-commerce," http://www.datacash.com/security/tradescreening.html, printed Apr. 23, 2002, 2 pages.
McCrea et al., "The Internal Report" prepared by CSIRO for the Australian Taxation Office as part of the ATO's Electronic Commerce Project, Jun. 1997, extracted from google database on Internet on Oct. 18, 2002.
"Faster Credit Card Authorization," Anonymous, Chain Store Age Executive with Shopper Center Age, New York, Mar. 1995.
Webster's II, New Riverside University Dictionary, Houghton Mifflin Company, p. 1129, 1994.
CyberSource Corporation, "Internet Commerce Services", undated.
CyberSource Corporation, "Electronic Software Distribution", undated.
CyberSource Corporation, "Advertising Opportunities", undated.
CyberSource Corporation, "Customer Profile", undated.
Steve Kichen, "Impulse Items", Forbes, May 8, 1985.
Michael Moeller, "New CyberSource of Information", PCWeek, Nov. 20, 1995.
Heather Clancy, "Internet Makes Headway As Software Distribution Channel", Computer Reseller News, Nov. 20, 1995.
Martin Marshall, et al., "Shopping for Software Object on the Web", CommunicationsWeek, Nov. 20, 1995.
"Software.net, Product Brief", 1995, 4 pages, HP Internet Solutions, http://www.hp.com/go/internet, http://software.net, 1995.
William S. McKiernan, et al., "Microsoft Corp. Chooses Software.net To Be First To Electronically Deliver Microsoft Software", Oct. 17, 1995, press release, pp. 1-3.
Joan E. Rigdon, "Microsoft to Sell Most Popular Software Through Resellers Using the Internet", The Wall Street Journal, Oct. 16, 1995.
William S. McKiernan, et al., "Software.net Opens Internet Product Center To Connect Internet Publishers With Internet Customers", Oct. 23, 1995, Press Release Summary, pp. 1-4.
Keith Mary Rantas-Drew, et al., "IBM and Cybersource Corporation Tap Into The Power of the Internet to Offer One-Stop Component Shopping", Nov. 13, 1995, Media Information, International Business Machines Corporation, pp. 1-4.
One page flyer, "Software.net", A Service of CyberSource Corporation, http://software.net, Oct. 1995.
"About CyberCash, Inc.", 2000, http//www.cybercash.com/company, CyberCash Company Information, 1 page.
Dr. Andreas Schoter, et al., Digital Money Online A Review of Some Existing Technologies, Feb. 1997, pp. 1-5, inter://trader.
CyberSource Corporation, "Largest Internet-Based Electronic Software Superstore, Over 20,000 Software Titles", http://software.net.
CyberSource Corporation, "CyberSource IVS, Internet Fraud Screen with Artificial Intelligence", http://www.cybersource.com/html/solutions/fraud_main.html#overview, 3 pages.
One page flyer, "Where Developers Go For Parts", Fact Sheet, http://components.software.net.
Niehaus Ryan Group, "CyberSource's ICS Launch PR Plan", Jan. 1997, pp. 1-25.
"CyberSource Internet Commerce Services", CyberSource Corporation, 1997, 6 pages, www.cybersource.com.
Karen Rodriguez, "CyberSource Sells Software On Internet", InfoWorld Reprint, 1995, Software Distribution On-Line.
Joan E. Rigdon, "CyberSource Begins to Offer Software of Symantec and Others on the Internet", The Wall Street Journal, Reprinted, Jan. 31, 1995.
Bradley F. Shimmin, "Software Sales Brought to the Internet, Software.net expands the sales channel to the World Wide Web", LAN Times, vol. 12, Issue 1, Jan. 9, 1995, http://software.net.
Clinton Wilder, "Where to Buy Objects Over the Internet, CyberSource Creates First Electronic Store For Software Components", Informationweek, Dec. 11, 1995.

Tom Clements, et al., "CyberSource Corporate Backgrounder", CyberSource Corporation, Menlo Park, CA, undated.

"CyberSource Corporation, News & Press Release Abstracts", pp. 1-3, undated.

Tom Clements, et al., "CyberSource's New Internet Commerce Services Provide Software Publishers Turn-Key Electronic Transaction and Distribution Services, Qualcomm, Insignia, Wall Data and seven other publishers choose CyberSource to distribute products via the Internet", Apr. 30, 1996, pp. 1-4, press release.

"Internet Commerce Services, Schedule of Services for Distributors and Merchants", CyberSource Corporation, Sep. 6, 1996, pp. 1-11.

"Merchant Internet Commerce Services, Typical Commerce Site Functions and Integration Check List", CyberSource Corporation, 1996, pp. 1-6.

"ICS Launch Schedule", pp. 1-2, prepared and printed Dec. 1996.

"ICS Customers", 1 page, prepared and printed Dec. 1996.

Rob Kelman, "Content Outline", Marketingworks, CyberSource Capabilities Brochure Outline-Revised, Dec. 10, 1996, pp. 1-7.

CyberSource Corporation, "ICS CommerceFLEX, Developer's Guide and Reference", Apr. 14, 1997, pp. 1-78.

Eric Bodner, et al., "The Internet Billing Server: Prototype Requirements", pp. 1-96, A Thesis submitted to the Information Networking Institute in Partial Fulfillment of the Requirements for the degree, Carnegie Mellon University, Information Networking Institute, undated.

Eric Bodner, et al., "The Internet Billing Server: Design Document", pp. 1-131, A Thesis submitted to the Information Networking Institute in Partial Fulfillment of the Requirements for the degree, Carnegie Mellon University, Information Networking Institute, undated.

Guerra, Jennifer L., Letter from Canada Intellectual Property Office to Paul R. Smith (CIPO Office Action), Jan. 19, 2007, pp. 1-9, issued by CIPO, Ottawa, Canada.

Berry, Michael J. A., et al., "Data Mining Techniques For Marketing, Sales, and Customer Support", John Wiley & Sons, Inc., Wiley Computer Publishing, Jul. 2, 1997, 5 pages.

Alfuraih, S., et al. "Using Trusted Email to Prevent Credit Card Frauds in Multimedia Products", World Wide Web Internet and Web Information Systems, 5, 2002, pp. 245-256.

Allen, S., "Credit Card Fraudsters? Swat Them!", On the Line (Mar./Apr. 1997) p. 32.

"An e*guide to Cyberfraud", ClearCommerce Corporation, 1999, pp. 1-9.

"ATACS™: How ATACS Works", Bedford Associates, Inc., 1996.

Cunningham, J. Lawrence, "Cutting cell fraud frequency", Security Management, Oct. 1996, pp. 42-46, vol. 40, No. 10.

"CyberSource® Advanced Fraud Screen Enhanced by Visa®, Implementation Guide", CyberSource Corporation, Jul. 2004, 112 pages.

"CyberSource Corporation, Fraud Control System", CyberSource Corporation, 1996, archived at http://web.archive.org/web/19970110062645/http./1/cybersource.com/products/fcs.html.

"Frequently Asked Questions", CyberSource Corporation, 1997, archived at http://web.archive.org/web/19971021082803/http://www.cybersource.com/faq/danger.htm.

"Merchant Internet Commerce Services", CyberSource Corporation, 1997, archived at http://web.archive.org/web/19971021082508/www.cybersource.com/service/ivs.htm.

Declaration of Donna Tucker, filed in *In re* Patent Application of: John P. Pettitt, executed on Oct. 8, 2004 (2 pages).

Fawcett, T. et al, "Adaptive Fraud Detection", Data Mining and Knowledge Discovery (to appear, 1-28, 1997), Kluwer Academic Publishers, pp. 1-29.

Fawcett, T. et al., "Adaptive Fraud Detection", Data Mining and Knowledge Discovery 1, 1997, pp. 291-316.

Fawcett, T. et al., "Combining Data Mining and Machine Learning for Effective User Profiling", Proceedings of the Second International Conference on Knowledge Discovery and Data Mining, KDD-96, AAAI Press, 1996, pp. 8-13.

Gein, Robert A., et al., "The ABCs of Credit Card Processing", Perspectives, American Public Communications Council Inc., Dec. 1995, pp. 13-18.

Gifford, David K., et al., "Payment Switches for Open Networks", Proceedings of the 40th IEEE Computer Society International Conference, 1995, IEEE, pp. 26-31.

Lamm, Stephen E., et al., "Real-Time Geographic Visualization of World Wide Web Traffic", Computer Networks and ISDN Systems 28, 1996, Elsevier Science B. V., pp. 1457-1468.

Newing, R., "Data Mining", Management Accounting, Oct. 1996, pp. 34-36.

Scullin, Will H., et al., "Real-Time Visualization of World Web Traffic", 1995, pp. 1-13.

"SNET Network Fraud Control System", SNET Interconnection Services Group, Jan. 1994, (2 pages).

K. Shinohara, "Notification of Grounds for Rejection" (in Japan patent application 2002-539907), Japan Patent Office, Mar. 13, 2007, 4 pages.

* cited by examiner

Fig. 5C

| 590A INTERNET IDENTITY VALUE | |
|---|---|
| 592<br>HASH OF EMAIL ADDRESS | 594<br>HASH OF CARD BIN VALUE |

| 590B INTERNET IDENTITY VALUE | | |
|---|---|---|
| 592<br>HASH OF EMAIL ADDRESS | 594<br>HASH OF CARD BIN VALUE | 596<br>HASH OF SHIPPING ADDRESS |

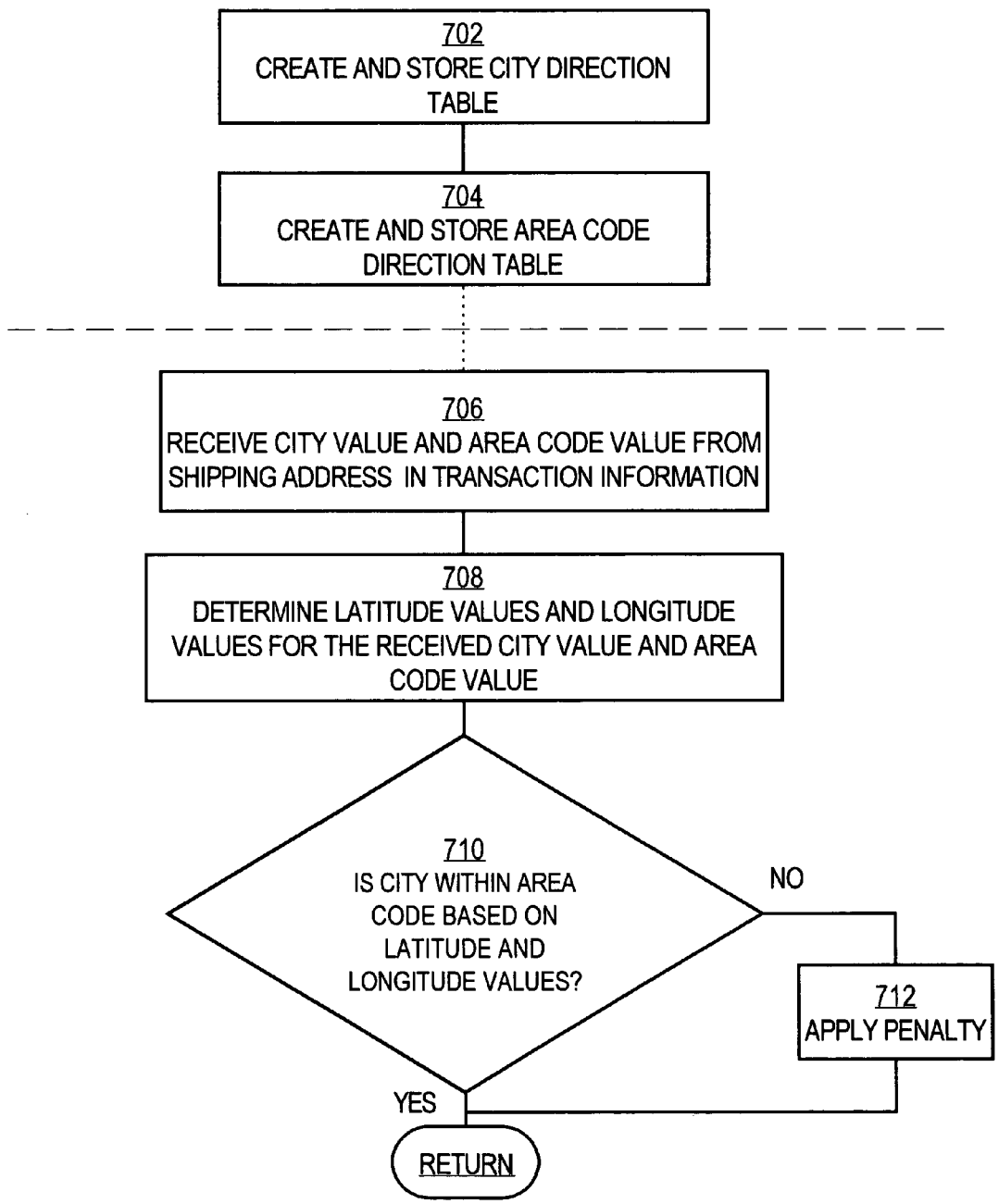

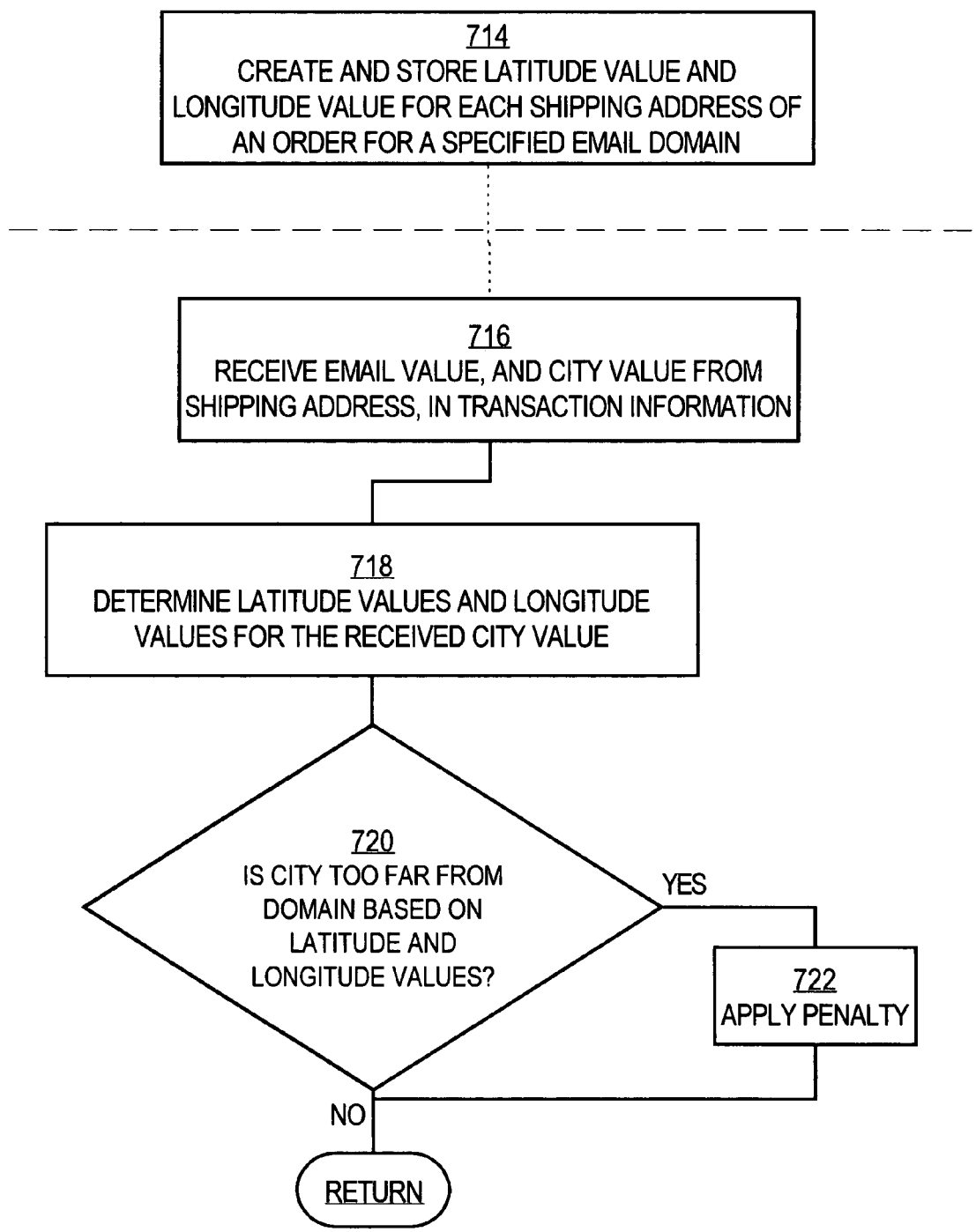

METHOD AND APPARATUS FOR EVALUATING FRAUD RISK IN AN ELECTRONIC COMMERCE TRANSACTION

RELATED APPLICATIONS

Continuation-in-part of Ser. No. 09/442,106, filed Nov. 17, 1999, which is a continuation of Ser. No. 08/901,687, filed Jul. 28, 1997, now U.S. Pat. No. 6,029,154.

FIELD OF INVENTION

The present invention generally relates to electronic commerce transaction processing. The invention relates more specifically to a method and apparatus for evaluating fraud risk in an electronic commerce transaction.

BACKGROUND OF THE INVENTION

Any business that accepts bank cards for payment accepts some amount of risk that the transaction is fraudulent. However, for most merchants the benefits of acquiring bank cards outweigh any of the risks. Conventional "brick and mortar" merchants, as well as mail order and telephone order merchants, have enjoyed years of business expansion resulting from bank card acceptance, supported by industry safeguards and services that are designed to contain and control the risk of fraud.

Credit card transactions are being utilized in a variety of environments. In a typical environment a customer, purchaser or other user provides a merchant with a credit card, and the merchant through various means will verify whether that information is accurate. In one approach, credit card authorization is used. Generally, credit card authorization involves contacting the issuer of the credit card or its agent, typically a bank or a national credit card association, and receiving information about whether or not finds are available for payment and whether or not the card number is valid. If the card has not been reported stolen and funds are available, the transaction is authorized. This check results in an automated response to the merchant of "Issuer Approved" or "Issuer Denied." If the merchant has received a credit card number in a "card not present" transaction, such as a telephone order or mail order, then the credit card authorization service is often augmented by other systems, but this is the responsibility of the individual merchant.

For example, referring now to FIG. 1, a typical credit card verification system 10 is shown. In such a system, a merchant 12 receives a credit card from the customer 14. The merchant then verifies the credit card information through an automated address verification system ("AVS") 16. These systems work well in a credit card transaction in which either the customer has a face-to-face meeting with the merchant or the merchant is actually shipping a package or the like to the address of a customer.

The verification procedure typically includes receiving at the AVS system address information and identity information. AVS is currently beneficial for supporting the screening of purchases made by credit card customers of certain banks in the United States. In essence, the bank that issues a credit card from either of the two major brands (Visa or MasterCard) opts whether or not to support the AVS system. The AVS check, designed to support mail order and telephone order businesses, is usually run in conjunction with the bank card authorization request. AVS performs an additional check, beyond verifying funds and credit card status, to ensure that elements of the address supplied by the purchaser match those on record with the issuing bank. When a merchant executes an AVS check, the merchant can receive the following responses:

AVS=MATCH—The first four numeric digits of the street address, and the first five numeric digits of the ZIP code, and credit card number match those on record at the bank.

AVS=PARTIAL MATCH—There is a partial match (e.g., street matches but not ZIP code, or ZIP code matches but not street).

AVS=UNAVAILABLE—The system cannot provide a response. This result is returned if the system is down, or the bank card issuer does not support AVS, or the bank card issuer for the credit card used to purchase does not reside in the United States.

AVS=NON-MATCH—There is no match between either the address or ZIP data elements.

While most merchants will not accept orders that result in a response of "Issuer Denied" or "AVS=NON-MATCH," the automated nature of an online transaction requires merchants to implement policies and procedures that can handle instances where the card has been approved, but other data to validate a transaction is questionable. Such instances include cases where the authorization response is "Issuer Approved," but the AVS response is AVS=PARTIAL MATCH, AVS=UNAVAILABLE, or even AVS=MATCH. Thus, the purchaser's bank may approve the transaction, but it is not clear whether the transaction is valid.

Because a significant amount of legitimate sales are associated with AVS responses representing unknown levels of risk (or purchases made outside of the United States where AVS does not apply), it is critical to find ways to maximize valid order acceptance with the lowest possible risk. Categorically denying such orders negatively impacts sales and customer satisfaction, while blind acceptance increases risk. Further, even AVS=MATCH responses carry some risk because stolen card and address information can prompt the AVS=MATCH response.

To address these issues, merchants have augmented card authorization and AVS results with additional screening procedures and systems. One such additional procedure is to manually screen orders. While this approach is somewhat effective when order volume is low, the approach is inefficient and adds operating overhead that cannot scale with the business.

Electronic commerce or online commerce is a rapidly expanding field of retail and business-to-business commerce. In electronic commerce, a buyer or purchaser normally acquires tangible goods or digital goods or services from a merchant or the merchant's agent, in exchange for value that is transferred from the purchaser to the merchant. Electronic commerce over a public network such as the Internet offers an equal or greater business opportunity than conventional, brick-and-mortar business, but requires special precautions to ensure safe business operations. The technological foundation that makes e-shopping compelling—e.g., unconstrained store access, anonymity, shopping speed, and convenience—also provides new ways for thieves to commit credit card fraud.

When a transaction involves downloading information from an online service or the Internet, address and identity information are not enough to confidently verify that the customer who is purchasing the goods is actually the owner of the credit card. For example, an individual may have both the name and the address of a particular credit card holder and that information in a normal transaction may be sufficient for authorization of such a transaction. However, in an Internet transaction it is possible to obtain all the correct information related to the particular credit card holder through unscrupulous means, and therefore, carry out a fraudulent transaction.

Accordingly, what is needed is a system and method that overcomes the problems associated with a typical verification system for credit card transactions particularly in the Internet or online services environment. The system should be easily implemented within the existing environment and should also be straightforwardly applied to existing technology.

While not all merchants experience fraud, as it is highly dependent on the nature of the business and products sold, in one study the aggregate risk of fraud was found to range between 4% and 23% of authorized sales transacted, depending upon the lenience of the merchant's acceptance criteria. Because Internet transactions are classified as "Card Not Present" transactions under the operating rules of the major credit card associations, in most cases Internet merchants are liable for a transaction even if the acquiring bank has authorized the transaction. As a result, fraud has a direct and immediate impact on the online merchant.

Electronic commerce fraud is believed to be based largely on identity theft rather than stolen cards. Generally, in electronic commerce fraud that is based on identity theft, the legitimate cardholder does not detect or know that the identifying information or credit card account is being used illegally, until the cardholder reviews a monthly statement and finds fraudulent transactions. In contrast, in a stolen card case, the cardholder has lost possession of the card itself and usually notifies credit card company officials or law enforcement immediately. As a result, the impact of fraud is different in the electronic commerce context; it affects a merchant's operating efficiency, and possibly the merchant's discount rate and ability to accept credit cards.

In one approach, online merchants attempt to avoid this risk by declining all but the most safe orders, or by instituting manual screening methods. However, merchants using these approaches generally suffer business inefficiency and lost sales. These merchants turn away a significant portion of orders that could have been converted to sales, increase overhead costs, and limit business scalability. Thus both fraud and overly stringent methods or non-automated methods of protecting the business from fraud can negatively impact business operations.

Based on the foregoing, there is a clear need for an improved method and system for determining a fraud risk associated with an electronic commerce transaction There is a need for a way to assist merchants in screening fraudulent Internet transactions by calculating and delivering a risk score in real time.

There is also a need for a way to detect a fraud risk associated with an electronic commerce transaction that is based on criteria unique to or specific to the electronic commerce environment and attuned to the kinds of attempts at fraud that are perpetrated by prospective buyers.

There is a specific need for a way to determine a fraud risk associated with an electronic commerce transaction that is useful in a computer-based merchant services system.

SUMMARY OF THE INVENTION

The foregoing needs, and other needs that will become apparent for the following description, are achieved in the present invention, which comprises, in one aspect, a method and system for evaluating fraud risk in an electronic commerce transaction between consumer and a merchant over a network. The merchant requests service from the system over the network using a secure, open messaging protocol. An e-commerce transaction or electronic purchase order is received from the merchant, the level of risk associated with each order is measured, and a risk score is returned to the merchant. In one embodiment, data validation, highly predictive artificial intelligence pattern matching, network data aggregation and negative file checks are used to examine numerous factors to calculate fraud risk. The fraud screening system performs analysis that utilizes data elements submitted with the order, and includes data integrity checks and correlation analyses based on the characteristics of the transaction. Other analysis includes a comparative comparison of the current transaction against past known fraudulent transactions, and a search of a transaction history database to identify abnormal velocity patterns, name and address changes, and known defrauders. A risk score is generated and compared to the merchant's specified risk threshold. The result is returned to the merchant for order disposition. In-one alternative, scoring algorithms are regularly refined through the use of a closed-loop risk modeling process that enables the service provided by the system to be fine-tuned to adapt to new or changing fraud patterns. The legal scope of the invention is specified by the claims herein.

In other aspects, the invention encompasses a computer apparatus, a computer readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5C is a block diagram of alternative embodiments of an Internet identity value.

FIG. 7A is a flow diagram of a process of applying a geo-location test based on area code.

FIG. 7B is a flow diagram of a process of applying another geo-location test based on email address.

DETAILED DESCRIPTION OF THE PREFERRED EMBODIMENT

A method and apparatus for evaluating fraud risk of an electronic commerce transaction is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Fraud Detection Method and System

The present invention relates to a fraud detection method, system and apparatus for use in credit card transaction over online services or the Internet. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
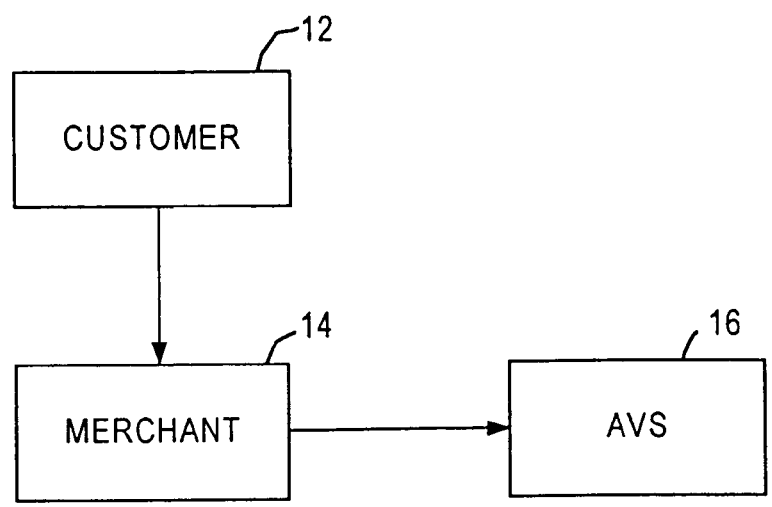
FIG. 1 is a block diagram of a credit card verification system.
Figure 2:
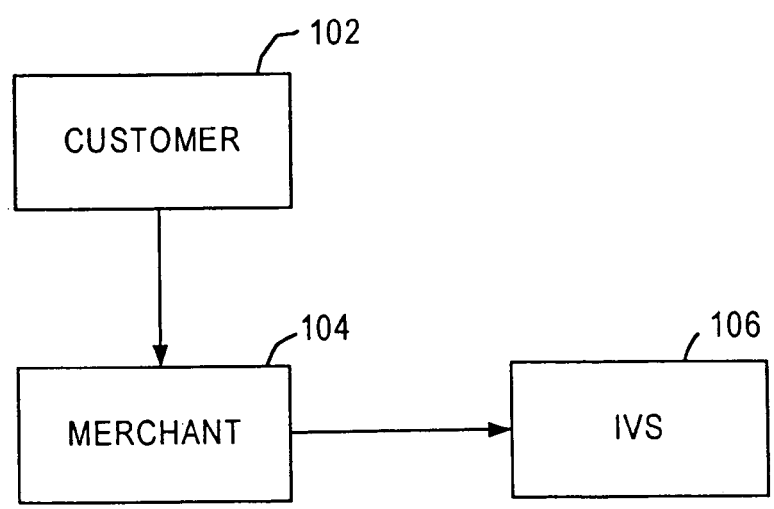
FIG. 2 is a block diagram of a system that can use the verification procedure FIG. 3.

The present invention provides an integrated verification system for credit card transactions over an online service or the Internet. FIG. 2 is a block diagram of a system 100 which would use the verification procedure in accordance with the present invention. System 100 includes, similar to FIG. 1, a customer 102 and a merchant 104. The customer 102 provides the merchant with a credit card, and the merchant then sends information from it to an integrated verification system ("IVS") 106, which includes a variety of parameters providing consistency, history and other information in an integrated fashion to determine whether the credit card information is valid. The IVS 106 is typically implemented in software for example in a hard disk, floppy disk or other computer-readable medium. In a typical embodiment, when the customer 102 orders a particular piece of software to be downloaded from a merchant 104, the merchant will provide the credit card number, e-mail address and other pertinent information to the IVS 106. The integrated verification system 106 then weights the variety of parameters so as to provide a merchant with a quantifiable indication on whether the credit and transaction is fraudulent. To more clearly describe the operation of a system and method in accordance with the present invention, refer now to the following discussion in conjunction with the accompanying figures.

Figure 3:
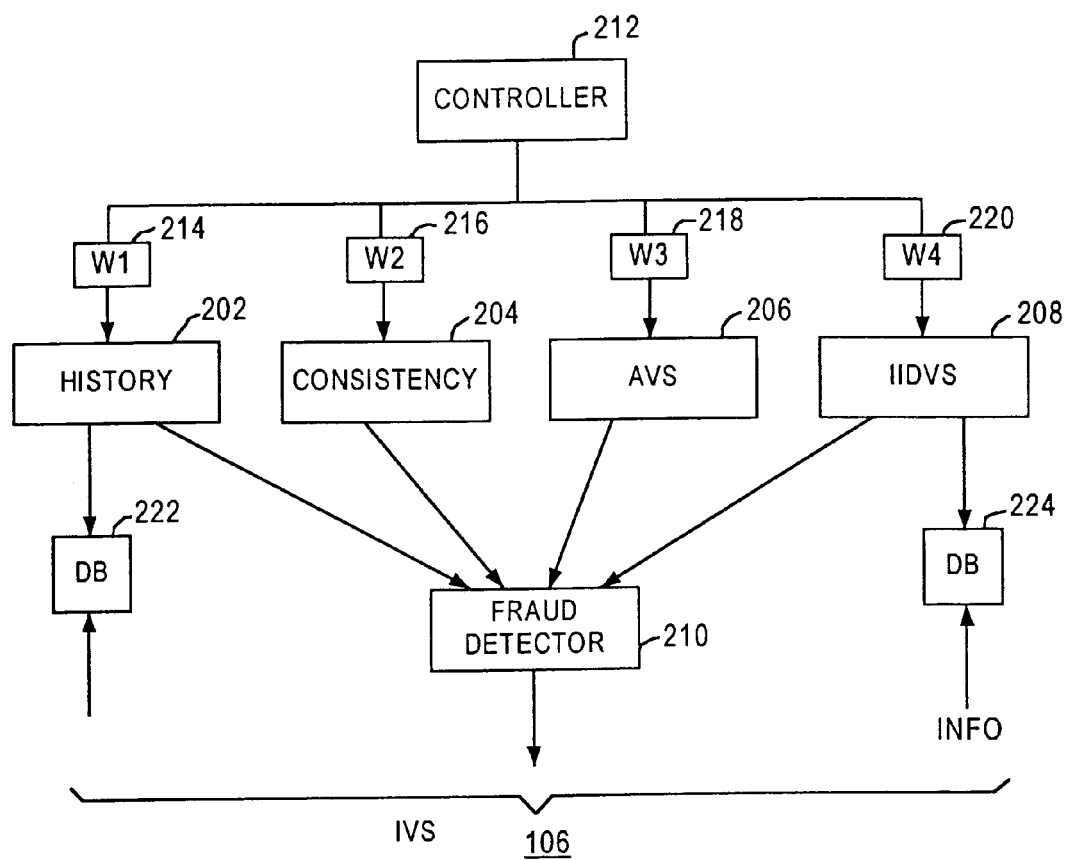
FIG. 3 shows a simple block diagram for providing an integrated verification of a credit card transaction over the Internet.

FIG. 3 shows a simple block diagram for providing an integrated verification of a credit card transaction over the Internet. The IVS 106 includes a controller 212 that receives the credit information from the merchant and then sends that information on to a variety of parameters 202-208. The plurality of parameters operate on the information to provide an indication of whether the transaction is valid. In this embodiment, the plurality of parameters comprises a history check 202, a consistency check 204, an automatic verification system 206 and an Internet identification verification system ("IIVS") 208. The output or individual indications of validity of these parameters are provided to fraud detector 210. The fraud detector 210 combines these inputs to provide an integrated indication of whether the particular transaction is valid.

Consistency check 204 allows IVS 106 to determine whether the credit information is consistent, i.e., does the credit information match the user and other information. AVS system 206 provides similar information as AVS 16 described in FIG. 1. A key feature of both the history database 222 and the Internet ID database 224 is that they can be accessed and the information therewithin can be supplemented by a variety of other merchants and, therefore, information from those merchants is obtainable thereby.

History check 202 is provided which also accesses a history database 222 which may include card number and email information. The history check 202 will also actively determine if the particular transaction matches previous database information within the history database 222. Therefore, the Internet ID verification system 208 and history check 202 increases in utility over time. The Internet ID verification system 208 provides for a system for verifying the validity of an Internet address, the details of which will be discussed hereinafter. The Internet identification verification system 208 similar to the history check 202 includes a database 224 which can be added to by other merchants.

In addition, the Internet identification verification system 208 accesses and communicates with a database of Internet addresses. This system will be used to verify whether the Internet address is consistent with other Internet addresses being used in transactions utilizing this credit card.

These different parameters are weighted via weighting blocks 214-220, respectively, dependent upon the particular credit card transaction. For example, if the amount of dollar transaction is critical, it may be appropriate for the history check 202 and AVS system 206 and 206 to be weighted more critically than the other parameters. On the other hand, if a critical point is the consistency of the Internet address, then the consistency check 204 and the Internet identification system 208 may be more critical. Accordingly, each of the verification parameters 202-208 may be weighted in different amounts depending upon its importance in the verification process.

A particularly important feature of the present invention is the Internet identification system 208 and its operation within the integrated verification system 106. Through this system 208, it is possible to quickly determine if an Internet identification address is being utilized fraudulently. To describe this feature in more detail, refer now to FIG. 4 and the accompanying discussion.

Figure 4:
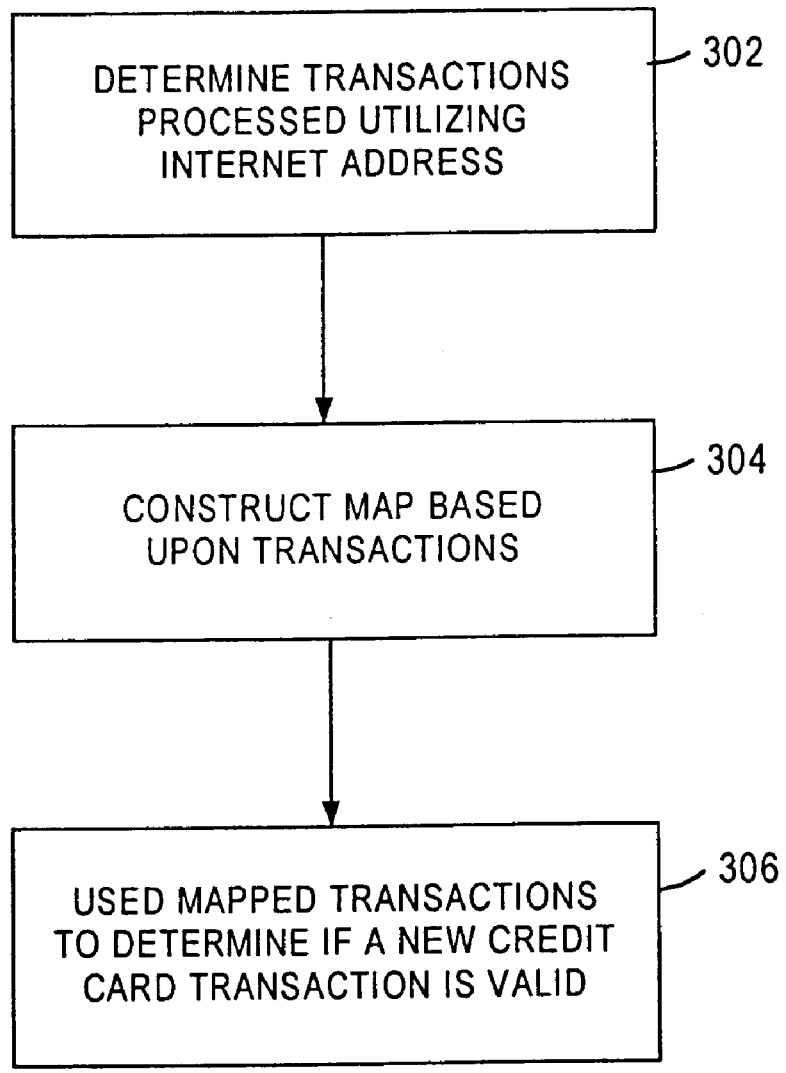
FIG. 4 is a flow chart of an embodiment of an Internet identification verification system.

FIG. 4 is a flow chart of the Internet identification verification system 208. The goal of Internet identification verification system 208 is to determine whether the physical address or the physical location of the address compares to a previous physical location that was used for that particular Internet address. Accordingly, in the flow chart of FIG. 4, first the number of transactions that had been processed using that particular Internet address is obtained from the database 224, via step 302. Thereafter, a map of those transactions is constructed based on those obtained transactions, via step 304. Finally, the constructed map is used to determine if the new credit card transaction is valid, via step 306. Accordingly, through a system and method in accordance with this system, an Internet identification verification system is provided which can quickly and easily determine whether a particular Internet address is related to a particular credit card transaction.

Accordingly, what is provided is a system and method for accurately determining whether a particular credit card transaction is a fraudulent one. An integrated verification system provides for weighting the variety of parameters so as to provide a merchant with a quantifiable indication on whether the credit and transaction is fraudulent.

Fraud Screening and Scoring System

According to an embodiment, an Internet fraud screening system is provided that examines e-commerce transactions and measures the level of risk associated with each transaction, returning a related risk score back to the merchant in real time. In one embodiment, the system uses data validation, highly predictive artificial intelligence pattern matching, network data aggregation and negative file checks to examine numerous factors to calculate fraud risk.

According to one feature, the system uses scoring algorithms that are regularly refined through the use of a closed-loop risk modeling process that enables the service provided by the system to be fine-tuned to adapt to new or changing fraud patterns.

In one specific embodiment, merchants request fraud screening service from the system over the Internet using a secure, open messaging protocol. Upon receipt, the fraud screening system performs four levels of analysis. The first two levels utilize the data elements submitted with the order and include data integrity checks and correlation analyses based on the characteristics of the transaction. The second two levels include a comparative analysis of the current transaction profile against profiles of known fraudulent transactions and a referenced search of the transaction history database to identify abnormal velocity patterns, name and address changes, and known defrauders. A risk score is generated and compared to the merchant's specified risk threshold. The result is returned to the merchant for order disposition.

Figure 5A:
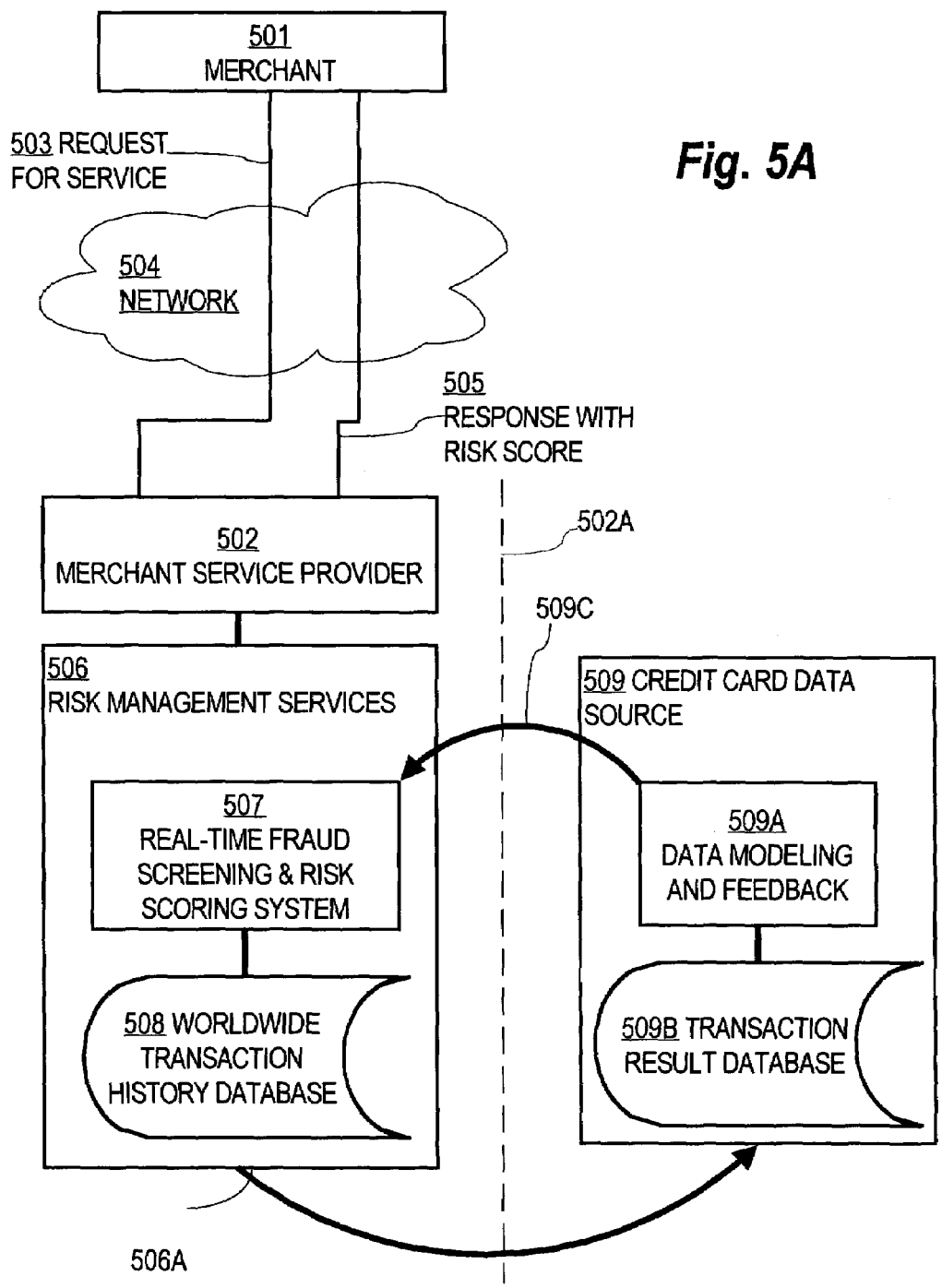
FIG. 5A is a block diagram of a fraud screening system.

FIG. 5A is a block diagram showing a fraud screening system including the context in which it may operate.

A merchant 501 sends a request for service 503 through one or more networks 504 to a merchant service provider 502, and receives a response 505 that contains a risk score for a particular transaction. Merchant 501, in FIG. 5A, may comprise one or more software elements that are associated with an online merchant, such as computer programs, Web application programs, CGI or Perl scripts, etc.

Merchant service provider 502 is an entity that provides electronic commerce services to online merchants. Such services may include, for example, payment services, tax computation services, fulfillment management, distribution control, etc. Merchant service provider 502 provides such services by or through one or more software elements that communicate through network 504. For example, the Internet Commerce Suite of CyberSource Corporation may provide such services. The foregoing information about merchant service provider 502 is provided only to illustrate an example operational context of the invention and does not constitute a required element of the invention.

Network 504 is one or more local area networks, wide area networks, internetworks, etc. In one embodiment, network 504 represents the global, packet-switched collection of internetworks known as the Internet. Although one merchant 501 is shown in FIG. 5A for purposes of illustrating an example, in a practical system, there may be any number of merchants.

Request 503 and response 505 may be routed over secure channels between merchant 501 and merchant service provider 502. In one particular embodiment, each request 503 and response 505 is a message that conforms to the Simple Commerce Message Protocol ("SCMP") of CyberSource Corporation (Mountain View, Calif.).

In one embodiment, one of the services provided by merchant service provider 502 is risk management services 506. As part of risk management services 506, merchant service provider offers a fraud screening and risk scoring system 507. The fraud screening and risk scoring system 507 interacts with a transaction history database 508 that contains records of a large plurality of past, completed electronic commerce transactions. In this configuration, fraud screening and risk scoring system 507 can receive the request for service 503, consult transaction history database 508, perform various fraud screening checks, and create and store a risk score for the transaction. When fraud screening is complete, the risk score for the transaction is returned to the merchant in response 505.

Fraud screening and risk management system 507 communicates over secure paths 506A, 509C with a credit card data source 509 that has a data modeling and feedback mechanism 509A and a transaction result database 509B. Credit card data source 509 is any institution or system that maintains a database of information representing a large plurality of actual credit card transactions, including both successful, non-fraudulent transactions and transactions that result in charge-backs by an acquiring bank to a card-issuing bank. In one embodiment, credit card data source 509 is associated with one of the major national credit card associations and therefore includes a large database of credit card transaction and charge-back data.

As discussed further herein, fraud screening and risk scoring system 507 may use one or more computer-implemented tests and mathematical algorithms to evaluate fraud risk associated with a transaction. The performance of the screening and scoring system may be refined in terms of predictability and accuracy by carrying out data modeling and feedback based on risk score values generated by the system in comparison to information in transaction result database 509B.

For example, assume that fraud screening and risk scoring system 507 receives transaction information and assigns a risk score value that indicates a relatively low risk associated with completing the transaction. However, the transaction is in fact fraudulent and results in a charge-back request from the cardholder's card-issuing bank to the merchant 501. The charge-back request is processed by the credit card data source and a record of it is made in transaction result database 509B. In this scenario, credit card data source 509 can improve the performance of fraud screening and risk scoring system 507 by periodically receiving transaction information and risk score values over path 506A, and reviewing matching information in transaction result database 509B. Based on characteristics of the matching information, credit card data source 509 can carry out data modeling and feedback 509A and provide revised weight values, discrete score values, or even new statistical algorithms over path 509C to fraud screening and risk scoring system 507. The fraud screening and risk scoring system 507 may then use the new information to carry out subsequent screening evaluations with improved accuracy.

In this configuration, privacy of cardholders is maintained by logically or physically isolating merchant service provider from credit card data source 509, as indicated by line 502A. Thus, credit card data source 509 may be located at a different physical location and structured in a way that fraud screening and risk scoring system 507 cannot issue queries directly to or otherwise communicate with transaction result database 509B. In practice the database 509B is expected to be maintained with high security in order to preserve the confidentiality of credit card numbers and purchase information therein.

Figure 5B:
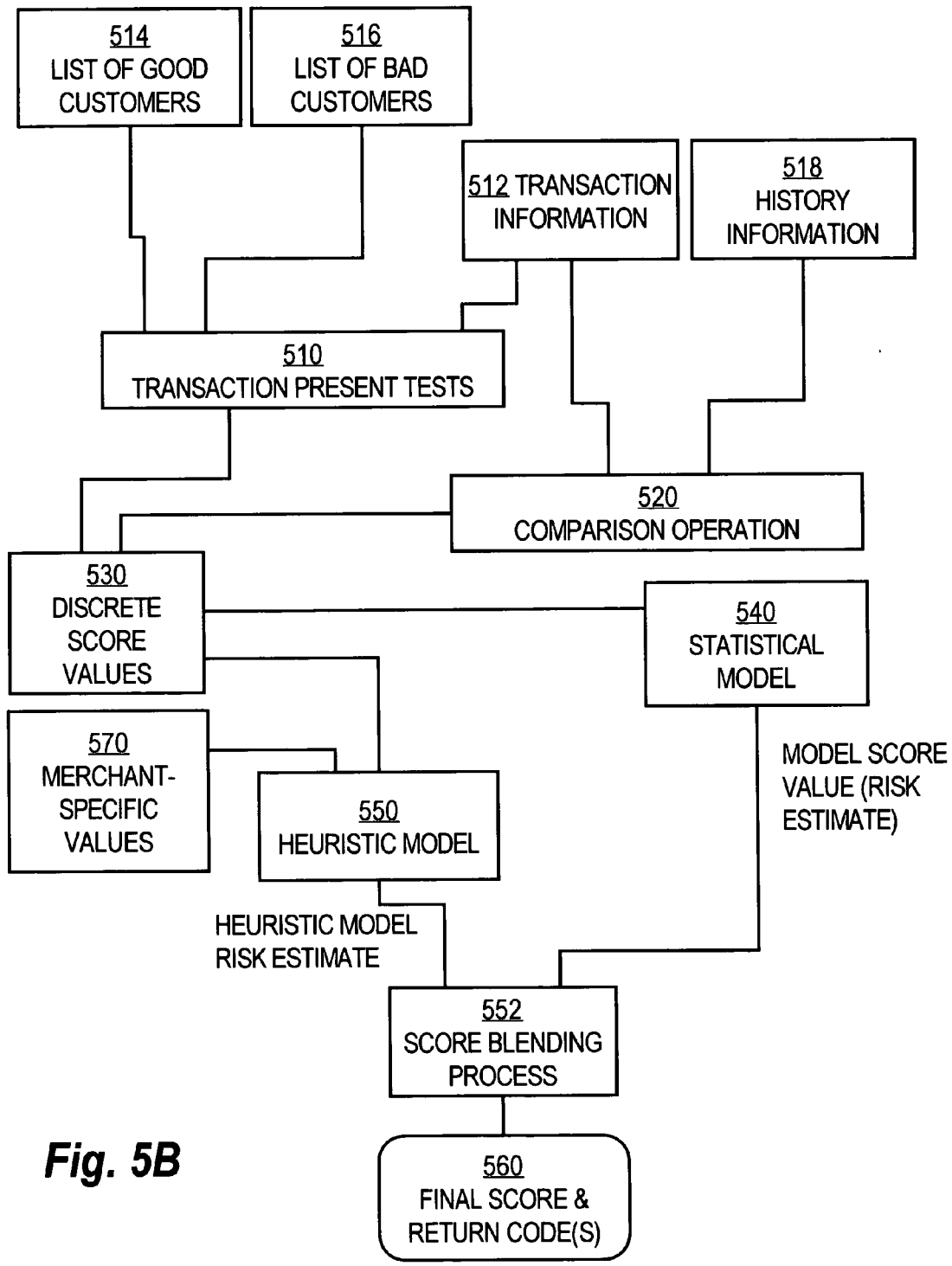
FIG. 5B is a block diagram showing further detail of the fraud screening system of FIG. 5A.

FIG. 5B is a block diagram of a transaction verification system that may be used to implement fraud screening and risk scoring system 507.

Generally, the system of FIG. 5B can evaluate information representing one or more transactions to result in creating and storing a score value that represents a risk to a merchant associated with processing the transaction. Transaction information 502, a list of good customers 504, and a list of bad customers 506 and other pertinent information are received from a merchant who wishes to screen transactions using the system. Transaction information 502 comprises specific information that describes a particular purchase transaction, such as customer name, shipping address, billing address, time, products ordered, price or amount of order, method of payment, card number and expiration date for credit card payments, etc. The transaction information 502 also may include Internet-specific information such as customer domain, email address, IP address, etc.

Transaction history information 508 also is received from the merchant or maintained by the system. History information 508 comprises information about past transactions for the same merchant and customer that the system has processed. Specific values in history information 508 include the same values described above with respect to transaction information 502. Thus, history information 508 may comprise a database of records of past transactions. The history information 508 is maintained in a database at the service provider that is processing the transactions.

The list of good customers 504 and list of bad customers 506 comprise one or more tables or lists of information identifying past customer of the merchant with which the merchant has successfully collected funds for a transaction ("good customers") or experienced non-payment from a disputed transaction, fraud, etc. ("bad customers"). Alternative, lists 504, 506 may comprise order information that is marked as good or bad by the merchant, and in practice, such lists are treated as good or bad markings of customers themselves or their Internet identities.

The transaction information 502 is first subjected transaction present tests 510. The transaction present tests 510 comprise a plurality of computer-implemented filters, tests, computations and other operations that determine whether transaction information 502 genuinely represents a good transaction. For example, transaction present tests 510 determine whether transaction information 502 is expressed in proper form, etc., to arrive at a value representing the relative risk that the customer is attempting to pass a fraudulent order through the system. Further information about transaction present tests 510 is set forth herein.

If the transaction information 502 passes transaction present tests 510, then in comparison operation 520, transaction information 502 is compared to history information 508 to result in creating and storing one or more discrete score values 530. Each of the discrete score values 530 represent a relative risk evaluation carried out individually by transaction present tests 510 and comparison operation 520. Further information about history testing is set forth herein.

The discrete score values 530 are then applied to a statistical model 540, resulting in creating and storing one or more weight values and model score values. Statistical model 540 comprises one or more weighted computations or other computer-implemented mathematical operations that apply statistical formulae and weight values to the discrete scores. The purpose of statistical model 540 is to apply statistical analysis, based on the history information 508 and other records of what transactions have been found in practice to be actually fraudulent, to the discrete score values 530.

The discrete score values 530 are also applied, in parallel, to a Heuristic Model 550 to generate a Heuristic Model Risk Estimate.

The resulting model score value from Statistical Model 540 and Heuristic Model Risk Estimate from Heuristic Model 550 are blended using Score Blending Process 552 to produce an overall final risk estimate. Thus, Score Blending Process 552 provides a way to combine the Heuristic Model score with the model score value created as output by statistical model 540.

Heuristic Model 550 may also take into account one or more merchant-specific values 570. Merchant-specific values 570 may comprise, for example:

1. Product category information, such as a value that limits the maximum number of products in a particular category that a customer is permitted to purchase online in one transaction. Product categories may be specified by the transaction processing system, or specified by the merchant;
2. Selling frequency information, i.e., how often a customer is permitted to buy a particular product over a specified period of time, e.g., a subscription product that can be purchased only once a week;
3. One or more time of day weight values that indicate how important the buyer's time of purchase is, or that indicate what range of time in a day represents a reasonable time at which a buyer is expected to buy a particular product;
4. A "risky host" weight value that reflects an amount of risk associated with a particular host from which a customer order originates, as indicated by the customer's originating IP address or customer's claimed e-mail domain;
5. A gender bias value that indicates whether a specified product is strongly expected to be associated with a purchaser of a particular gender, so that risk increases if the system determines that the purchaser is probably of the other gender;
6. A value indicating the relative weight placed by the merchant on a difference in billing address and shipping address of the customer;
7. A first "velocity" value indicating how often the buyer has made online purchases at all;
8. A second "velocity" value indicating how often the buyer has made online purchases of a specified product category from a specified merchant.

Use of the merchant-specific values is optional.

As a result of blending the heuristic model and statistical model scores, a final score value and one or more return code values are created and stored, as indicated by block 560. In one embodiment, the final score value is in the range of 0-100, where "0" represents a transaction that is extremely unlikely to involve fraud and "100" involves a transaction that is highly likely to represent fraud. The return code values signify special results or other functions.

In one embodiment, one of the return codes comprises one or more bytes of score flags that signal a recommendation to the merchant to reject the transaction regardless of any other criteria of the merchant. For example, score flags may indicate that one of the merchant "velocity" criteria exists in the order, or that prior orders related to the individual who placed the current order are on a fraud list. Alternatively, a score flag may indicate that a customer placing the current order is found in list of bad customers 506. If prior orders of the customer are on the fraud list, then the current transaction is automatically added to the fraud list as well.

The final score value and return code values are returned to the merchant in one or more messages, using an appropriate protocol. In one particular embodiment, the system of FIG. 5B creates a message that conforms to SCMP, packages the final score value and return code values in the SCMP message, and sends the SCMP message over a secure channel to the merchant.

Transaction Present Tests

In one embodiment, transaction present tests 510 comprise a plurality of tests selected from among the following:

1. A "Gibberish city" test detects whether the customer city name value has no vowels, is too short, or has three of the same letter in a row.
2. A "Gibberish last name" test detects whether the customer last name value has no vowels, is too short, or has three of the same letter in a row.
3. A "Gibberish first name" test detects whether the customer first name value received from the merchant has no vowels or has three of the same letter in a row.
4. A "Bad word in email" test detects whether the email address value received from the merchant contains a suspicious string.
5. A "Bad word in first name" test detects whether the first name value received from the merchant contains a string marked as high-risk.
6. A "Bad word in last name" test detects whether the last name value received from the merchant contains a string marked as high-risk.
7. A "Bad word in city" test detects whether the city value received from the merchant contains a string marked as high-risk.
8. A "State change(s) found" test detects whether historical orders related to the current request have different state values associated with them.
9. A "High number of credit cards" test detects whether historical orders related to the current request have many different credit card numbers associated with them.
10. A "Long term penalty" test detects whether the customer is attempting to make too many purchases of a product during the long-term hedge period specified by the merchant for the current order.
11. A "Fraud list" test detects whether information identifying the customer is found in an external fraud list.
12. A "Name Change(s) Found" test detects whether historical orders related to the current request have different customer last name values associated with them.
13. An "Email/name match" test detects whether the first name value or last name value provided by the customer also appears in the email address value provided by the customer.
14. A "Browser type penalty" test detects whether the customer is using a Web browser program that is marked as high-risk.
15. A "Browser email/email mismatch" test detects whether the email address that is stored as a configuration variable by the customer's Web browser program does not match the email address that the customer provided in the order information.
16. A "No electronic products" test detects whether the order contains no electronic or digital products, as opposed to tangible products.
17. A "Phone number bad length" test detects whether the telephone number value that the customer provided has the wrong number of digits.
18. An "Invalid phone number" test detects whether the telephone number value provided by the customer is invalid. For example, in the United States telephone numbers having the prefix "555" or "111" are invalid.
19. A "Suspicious area code" test detects whether the telephone number value provided by the customer includes a high-risk area code value.
20. An "Area code/state mismatch" test detects whether the area code within the telephone number value is associated with a state other than the state value provided by the customer.
21. An "Area code nonexistent" test detects whether the telephone area code value provided by the customer is not a valid area code or does not exist.
22. A "Toll-free phone number" test detects whether the telephone number value provided by the customer is a toll-free telephone number.
23. A "U.S. address with foreign domain" test detects whether the top-level domain portion of the email address value provided by the customer is associated with a foreign country but the shipping address or billing address value provided by the customer is a U.S. address.
24. A "Bill/ship state mismatch" test detects whether the shipping state value provided for an order does not match the state value in the billing address of the credit card information provided with the order.
25. A "Bill/ship country mismatch" test detects whether the shipping country value provided for an order does not match the country value in the billing address of the credit card information provided with the order.
26. An "AVS" test determines whether a score value associated with the order should be adjusted based on the results of testing the order information using an address verification system. An example of an address verification system is described in co-pending application Ser. No. 09/444,530, filed Nov. 22, 1999, "Method and Apparatus for Verifying Address."
27. A "BIN penalty" test determines whether a penalty value should apply because the Bank Identification Number ("BIN") received from the customer, which forms the first four to six digits of a conventional credit card number, is marked as high-risk.
28. A "Digits/all lower-case in name" test determines whether the customer name value is all in lower case, or contains numeric digit characters.
29. A "Sequential digits in phone number" test determines whether the customer telephone number value contains multiple consecutive sequential digits.
30. A "Goodguy" test determines whether matching customer information is found in list of good customers 104.
31. An "Unable to verify address" determines whether the customer address is unverifiable; international and military addresses may cause such a result.
32. A "City/state/zip mismatch" test determines whether the city, state, and ZIP code values provided by the customer are not associated with one another based on data available from the Postal Service.
33. An "IP address/hostname mismatch" test determines whether the resolved IP address associated with the customer does not match the hostname portion of the email address provided by the customer.
34. A "No hostname" test determines whether the customer IP address value received as part of the transaction information does not resolve, using the DNS system of the Internet, into a valid hostname value.
35. An "Email in originating domain" test detects whether the email address value provided by the customer is in the same domain as the customer's resolved domain name.
36. An "AOL user from non-AOL host" value detects whether the customer email address value purports that the customer is an America Online user, but the customer is communicating with the merchant from a host other than an AOL host.

37. An "ISP state mismatch" test detects whether a state value that is provided by an Internet Service Provider as part of a resolved domain name does not match the state value provided by the customer. For example, Microsoft Network provides customer state information as part of a resolved domain name, e.g., "chicago-il.us.msn.com," that can be checked against the state value provided by the customer in the transaction information.

38. A "Netcom oldstyle host" test detects whether the customer is using a shell account of the Internet service provider Netcom that can be used to hide the true identity of the customer.

39. A "Bill country/email mismatch" test detects whether the country value provided by the customer in its billing address information does not match the country value of the customer's email address.

40. A "Bill country/IP host mismatch" test detects whether the country value provided by the customer in its billing address information does not match the country in which the host indicated by the customer's IP address is located, based on resolution using the DNS system.

41. An "Email/IP host country mismatch" test detects whether the country value in the customer's email address does not match the resolved domain name country.

42. A "Whereis check negative" test detects whether the country associated with the customer's IP address, according to the "whereis" database of Network Solutions, Inc., does not match the country value of the customer's address information.

43. A "Time Risk" test determines the riskiness of the transaction time of day.

44. A "Host Risk" test determines the riskiness of the Internet source location from which the transaction originates, based on either email address or Internet domain ip_address.

45. A "Gender Mismatch Risk" test determines whether the customer gender violates normative expectations in relation to the specified product.

46. Several "Velocity" tests determine the riskiness of the buyer's behavior over time. One of these tests is more general, analyzing the buyer's overall e-commerce activity patterns. The other is more specific, analyzing the buyer's behavior at a specific merchant site with regard to specific categories of goods.

47. A "Gift" test determines whether a mismatch between the billing and shipping addresses is risky or not.

Other tests not specifically identified above may be used.

FIG. 7A is a flow diagram of a process of applying a geo-location test based on area code.

The geo-location test of FIG. 7A uses information in two tables. In block 702, a city direction table is created and stored. The city direction table has rows that correspond to city values in a customer shipping address. Columns of the table store the city name, a longitude value indicating the absolute longitude of the city, and a latitude value indicating the absolute latitude of the city. In block 704, an area code direction table is created and stored. The area code direction table has rows that correspond to all possible or known area code values. Columns of the table store one or more longitude values and latitude values that represent the bounds of the area contained within the area code. Alternatively, the area code direction table comprises area code values stored in association with vectors that indicate the boundaries of the area code in terms of latitude and longitude.

Using the values in the tables, information provided by a prospective customer may be tested. In one approach, the city value received from the customer is tested to determine whether it is within the area code value provided by the customer. For example, the position of the center of the city indicated in the city value provided by the customer is determined and then correlated to the values in the area code direction table. Stated another way, the test determines whether the area code specified by the customer actually contains the city specified in the shipping address.

In block 706, a city value and an area code value are received from the shipping address information in the transaction information for an order or customer. As indicated by the dashed lines separating block 704 and block 706, the action in block 706 may occur at a separate time interval from the action of block 702 and block 704. The separate time interval may be any duration. Thus block 702 and block 704 may be viewed as preparatory steps that may be carried out in an offline mode or at a separate time.

In block 708, latitude values and longitude values associated with the received city value and the received area code are determined. In one embodiment, a first latitude value and a first longitude value are obtained by looking up the city value in the city direction table, and a second latitude value and a second longitude value are obtained by looking up the received area code value in the area code direction table.

In block 710, based on the latitude and longitude values, the system tests whether the received city value is within the received area code value. If not, then a penalty value is applied to the transaction, as indicated by block 712. If the city is properly found within the limits of the specified area code, then no penalty is applied and control continues with other tests or order processing.

FIG. 7B is a flow diagram of a process of applying another geo-location test based on email address.

In the test of FIG. 7B, latitude and longitude values are created and stored for each shipping address for all orders from a specified email domain. If a plurality of past orders are concentrated around a particular range of latitude values and longitude values, and a subsequent order is received that provides a shipping address that is outside the range of the latitude values or longitude values, then the subsequent order is reported or tagged as high-risk.

A database table may store the latitude values, longitude values, and information identifying a historical order or a prior customer. In block 714, a latitude value and a longitude value is created and stored for each shipping address of an order that is processed by a transaction processing system, in association with information identifying a specified email domain. Thus, assume that transaction information is received that includes an email address of the customer in the form "john_custname@isp.com," and a shipping address for customer John Custname. Based on the city value in the shipping address, the system computes or otherwise determines (e.g., by a lookup in the city direction table that is created as part of FIG. 7A) a latitude value and longitude value for the city value. A record containing the domain value "isp.com," the latitude value, and the longitude value is created and stored in the database. The process of block 714 is carried out each time a transaction is processed in the system.

In block 716, an email address of a prospective customer, and a city value from the shipping address portion of transaction information, are received for a new order. Thus, block 716 can occur concurrently with block 714 or at some later time. In block 718, a latitude value and a longitude value are determined for the received city value.

In block 720, the process tests whether the received city value is too far from the domain indicated in the received email address value. For example, the process can determine whether the latitude value and longitude value for the received city value, as computed in block 718, differ too much from a metric that represents corresponding values in the database, e.g., a standard deviation value for the latitude value and longitude value. Alternative mechanisms may be used for determining that the received city value is too far from the geographical area indicated by all other city values for other transactions that reference the same email domain.

If the test of block 720 is true, then as indicated in block 722, a penalty is applied to the transaction. Otherwise, control continues with other tests or processing.

This test is effective when a particular Internet Service Provider (ISP) serves a geographically focused customer base. In that case, if an order arrives that includes a shipping address that is far outside the ISP's traditional geographical service area, then the system may hypothesize that the customer is using stolen identity information or stolen credit card information. Such a test may be supplemented with human review of score values in order to ensure that the rate of false negative results ("insults") is not too high.

Figure 7C:
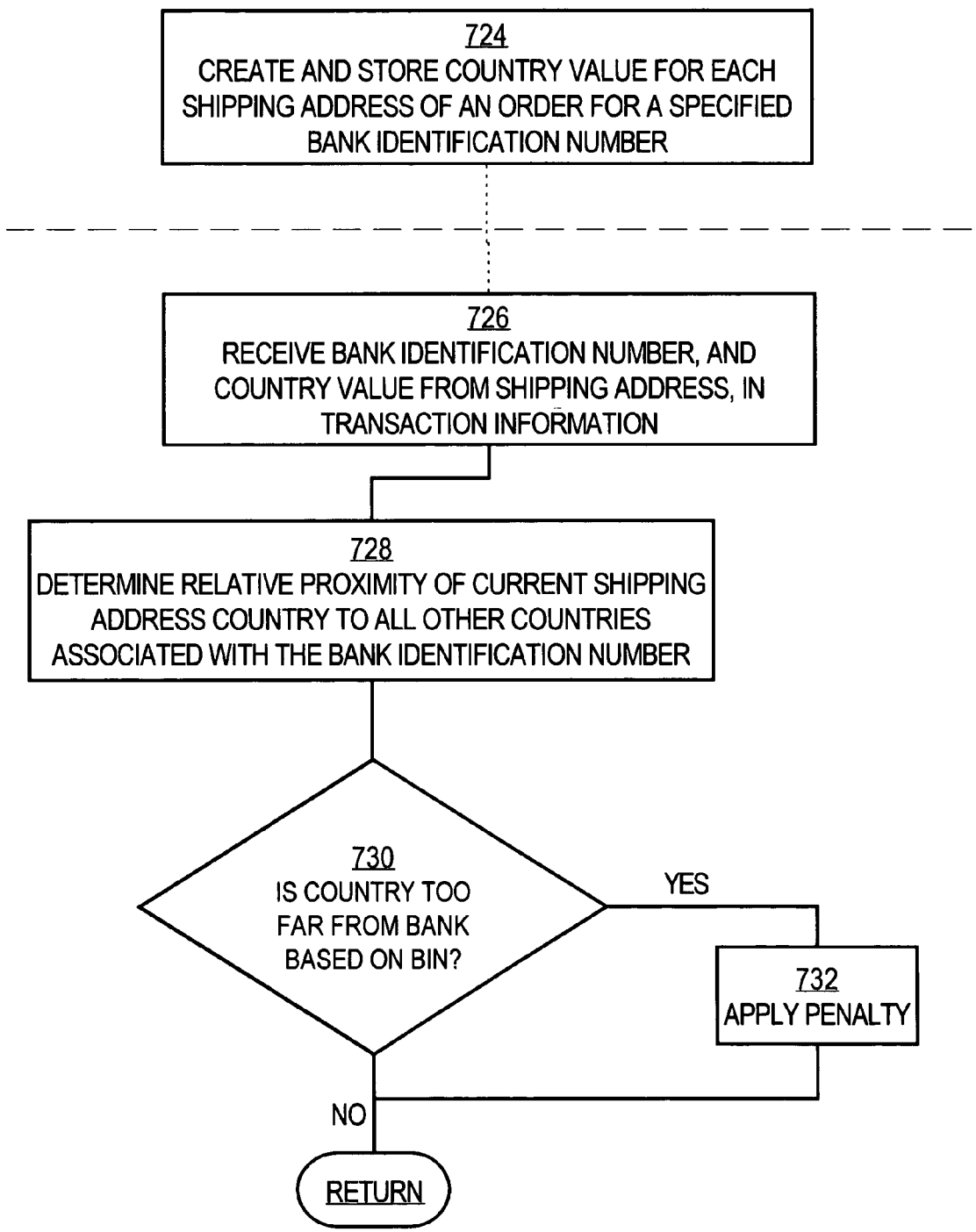
FIG. 7C is a flow diagram of a process of applying another geo-location test based on bank identification number.

FIG. 7C is a flow diagram of a geo-location test based upon bank identification number.

In FIG. 7C, the BIN value of the credit card number provided by a prospective customer is used in geographic consistency screening. In block 724, the country value of the shipping address in each order processed by the system is stored in association with the BIN value of the credit card number that is specified in the order. Thus, block 724 involves building a table that associates BIN numbers with the shipping address location of actual orders. Alternatively, in BIN value geo-consistency screening, a range of latitude and longitude values are stored in a database in association with a BIN value.

In block 726, a country value is received from the shipping address portion of transaction information for a new order. In block 728, the relative proximity of the current shipping address country value is determined, relative to all other countries associated with the bank identification number that is specified in the order. Block 728 may involve, for example, looking up a distance value or weight value in a country distance table that correlates every country of the world with every other country in the world. The distance value or weight value may reflect geographical distance, political distance, cultural distance, etc. For example, a value that correlates the United States to Canada might be very high, whereas a value that correlates the United States to Cuba might be very low because even though the United States is geographically close to Cuba, politically it is distant.

In block 730, a comparison is made to determine whether the country represented by the country value of the current order is too far from the bank that is associated with the BIN value, as indicated by the country distance table. If so, as indicated in block 732, a penalty is applied.

Thus, if a plurality of past orders that include a specified BIN value are concentrated around a particular range of countries, and a subsequent order is received that provides a shipping address that is outside the range of countries, then the subsequent order is reported or tagged as high-risk. This test is effective when a particular bank serves a geographically focused customer base. In that case, if an order arrives that includes a shipping address that is far outside the bank's traditional geographical service area, then the system may hypothesize that the customer is using stolen identity information or stolen credit card information. For example, assume that a customer presents transaction information 502 that identifies a credit card number that includes a BIN value associated with a bank headquartered in New York; however, the shipping address for the order includes a country value of "Bulgaria." This may indicate that the order is fraudulent. Such a test may be supplemented with human review of score values in order to ensure that the insult rate is not too high.

Gibberish Tests

Figure 6:
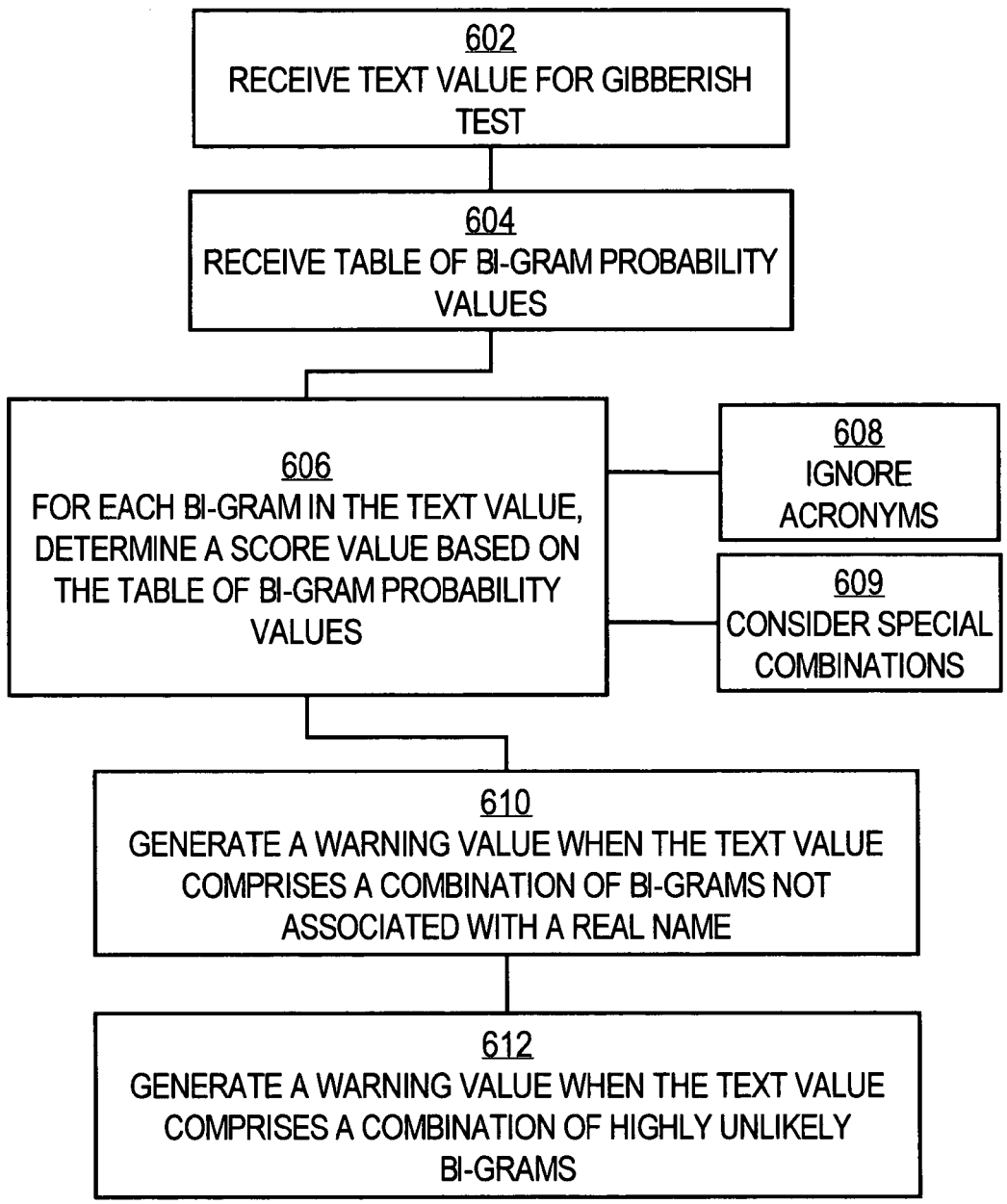
FIG. 6 is a flow diagram of a process of detecting gibberish text.

Transaction present tests 510 may include one or more tests to determine whether one or more values of transaction information 102 consist of unintelligible or meaningless text ("gibberish"). FIG. 6 is a block diagram of an example embodiment of a gibberish test.

In block 602, a text value for gibberish testing is received. For example, gibberish testing may be applied to a customer first name value or a last name value received from a merchant for a particular customer.

In block 604, a table of bi-gram probability values is received. In one embodiment, the table of bi-gram probability values consists of rows representing letter pairs ("bi-grams") and columns representing the likelihood that a specified bi-gram will appear (a) as the first pair of letters in of a text string, (b) anywhere in the middle of the text string, or (c) as the last pair of letters in a text string, where one column of the table is associated with situation (a), (b), and (c).

An example of a bi-gram is "DA." For this bi-gram, the table could have a value of "80" in the first column position, indicating that the letter pair "DA" is likely to appear in the first ordinal position of a true name, as in "DAVID" or "DANIEL." For the same bi-gram, the table could have a value of "20" in the second column position, indicating that a true name is unlikely to have the letter pair "DA" in the middle of the name. Other numeric values may be used. In one specific embodiment, the table of bi-gram probability values is created and stored manually or automatically based on name information received from a trusted source. For example, name information from U.S. census data may be used.

In block 606, for each bi-gram in the text value that is received in block 602, a score value is determined based on the table of bi-gram probability values. In one embodiment, block 606 involves scanning through each bi-gram in the received text value, and looking up each such bi-gram in the table. For each bi-gram, a score value is generated based on the corresponding probability value that is found in the table. If a bi-gram is not found in the table, a default value may be ascribed, typically representing a low probability.

As indicated in block 608, the score value determination in block 606 preferably ignores or screens out received text values that comprise acronyms. In one embodiment, acronyms are recognized in that a first received text value (e.g., first name) consists of all capital letters and a second received text value (e.g., last name) is mixed case. If an acronym is detected, then the score value determined in block 606 may be modified or set to a default value.

Special letter combinations may be considered, as indicated in block 609. For example, in one embodiment, the process of block 606 attempts to determine an ethnicity associated with the received text values, and if such a determination is made, the values obtained from the table may be adjusted. For example, in a large random sample of names, appearance of the bi-gram "SZ" in the first ordinal position of a last name value may be unlikely. However, that combination is common surnames of Eastern European origin. Accordingly, if the process can determine that a received first name value appears to be a Eastern European name, then certain other letter pairs are more likely to appear in the received text. For example, the letter pair "CZ" may be more likely. Therefore, in response, the probability value received from the table for such letter pairs may be adjusted.

Separate tables may be created and stored for first name values and last name values. Thus, block 604, block 606, block 608, and block 609 may involve separate iterations for a first name value and last name value.

Based on the score values determined in block 606, the process creates or generates one or more error values or warning values. In one embodiment, block 606 may involve a screening process whereby a score value representing an error is generated only when a bi-gram in the received text value is not found anywhere in the probability table. This option may be used to reduce processing time or when only a rough check of a text value is needed.

As an alternative, in block 610, a warning value is generated when the received text value comprises a combination of bi-grams that are determined to be unlikely to be associated with a real first name or last name.

As yet another alternative, as indicated by block 612, a warning value is generated only when the received text value comprises a combination of highly unlikely bi-gram values. In this alternative, the warning value is selected to indicate that the received text value is suspicious, but not so unusual as to warrant rejection of a transaction by the merchant.

The table of bi-gram probability values may be updated as additional information becomes available, e.g., at each census interval. Separate tables may be prepared for name values of foreign origin, e.g., Japanese names in kana representation.

History Testing—Comparison Operation

In one embodiment, comparison operation 520 involves comparing transaction information 502 to history information 508 to result in creating and storing one or more discrete score values 530. Such history testing generally involves verifying that the current transaction information 502 is consistent with all previous transactions associated with an individual.

In one embodiment, transactions are associated with an Internet identity. In this context, an "Internet identity" comprises a unique identifier of a purchaser or other individual who submits order transactions. An Internet identity may comprise an email address. Such an Internet identity value tends to facilitate better screening results in cases where an individual uses a plurality of different email addresses to place orders.

FIG. 5C is a block diagram of alternative embodiments of an Internet identity value. A first embodiment of an Internet identity value 590A consists of the combination of a hash value based on an email address, as indicated by block 592, and a hash value based on a credit card BIN value, as indicated by block 594. Using a value that includes a credit card number as a base element tends to improve accuracy for individuals who use multiple credit cards for different users. In this embodiment, each Internet identity value uniquely identifies a particular email address and card combination.

In any of the foregoing embodiments, in place of a credit card number, the system may use a value that uniquely identifies a purchase method other than a credit card. For example, if a customer uses an electronic check or a stored value card to make a purchase, a check number or card identifier may be used to create the Internet identity value.

Other combinations of values may be used. Referring again to FIG. 5C, a second embodiment of an Internet identity value 590B consists of the combination of a hash value based on an email address, as indicated by block 592, and a hash value based on a credit card BIN value, as indicated by block 594, and a hash value based on a shipping address, as indicated by block 596. This alternative improves accuracy where a plurality of orders use different email addresses and credit card numbers but are all shipped to the same address, especially in the case of residential deliveries.

Still other values could be used. For example, an Internet identity may comprise a first hash value of an prospective purchaser's host IP address, in combination with a second hash value of an email address of a prospective purchaser carried, in combination with a third hash value of a card bank identification number of the prospective purchaser and a fourth hash value based on a shipping address of the prospective purchaser. As another alternative, an Internet identity may comprise a first hash value of a prospective purchaser's hardware device ID value, in combination with a second hash value of either the email address or user ID of the prospective purchaser, in combination with a third hash value of a card bank identification number of the prospective purchaser and with a fourth hash value based on a shipping address of the prospective purchaser. What is important is to use a value that accurately represents the repeating identity of a particular Internet user across multiple orders, regardless of the host or terminal that the Internet user uses to connect to the network.

Historic transactions in history information 508 that are associated with the Internet identity of the current transaction may be obtained, for example, by issuing a database query to a database that contains the historical transaction information, and receiving a set of records in response as history information 508. As records are retrieved, comparison operation 520 looks for information that signals that the comparison operation should stop. In one embodiment, if any of the records that are returned from the database is for a prior order is on the fraud list, then the system skips comparison operation 520. This mechanism ensures that unnecessary processing is skipped for orders that are associated with past fraudulent orders, because if such orders are processed using comparison operation 520, they are certain to end in a negative result. Alternatively, history processing ceases if more than 500 history records are retrieved, and comparison operation 520 is carried out using only the 500 records that are retrieved. As a result, query time and overall transaction processing time is reduced. In addition, Internet identity values that are associated with test identities that are created by merchants to verify system operation are screened out.

In one embodiment, one of the return codes comprises one or more bytes of score flags that signal a recommendation to the merchant to reject the transaction regardless of any other criteria of the merchant. For example, score flags may indicate that one of the merchant "velocity" criteria exists in the order, or that prior orders related to the Internet identity that placed the current order are on a fraud list. Alternatively, a score flag may indicate that a customer placing the current order is found in list of bad customers 506. If prior orders of the customer are on the fraud list, then the current transaction is automatically added to the fraud list as well.

History information 508 may be created and stored by a transaction processing system of the type shown in FIG. 5 as it processes transactions. In one embodiment, the system creates and stores one or more score logs. Each record of a score log identifies a transaction and contains one or more penalty values that resulted from application of the transaction present tests 510 and other tests of the system to the transaction information 502. Thus, manual or automated review of the score logs may reveal how a particular transaction was processed in the system.

Further, in one embodiment, the system includes a test scores table, and the system updates values in the test scores table as it processes transactions. The test scores table contains, for each order, a result value or penalty value for each test that is conducted for an order. In a specific embodiment, the test scores table comprises columns for order number, email address, credit card number, and columns for each test that is carried out as part of transaction present tests 510. The test scores table may also include the model score value that is provided as output from statistical model 540, and the final score value and return codes that are provided at block 560 of FIG. 5.

Accordingly, using data in the test scores table, statistical evaluations of the test results may be created. Further, database queries may be applied to the test scores table in order to retrieve orders that are related in some manner. In the past approach, such processing required test parsing of the score logs. In the present approach, such parsing is eliminated, and improved views of the actual significance of tests are provided. As a result, the insult rate of a particular test may be rapidly and regularly evaluated.

Further, if transaction processing results in a high fraud score and the merchant rejects the order in response thereto, triggering a customer inquiry, then the merchant's customer service center can issue a query for the return codes and rapidly determine the exact reason for the high fraud score. The ability to obtain the return codes in a rapid manner also provides the merchant with a weapon against "social engineering," a fraud technique in which a declined customer telephones the merchant and attempts fabricates one or more reasons why the order should be accepted, in an attempt to verbally circumvent the merchant's computer-based fraud screens by playing to the emotions of the merchant's customer service representative. Using the disclosed system, the customer service representative can rapidly query the fraud screening system and receive a detailed description of why the order was refused. Such description may be generated based on one or more of the return code values.

Statistical Modeling

Statistical model 540 comprises a plurality of computations that are based upon actual discrete scores that are weighted in non-linear combination, based on likelihood of indicating an actual fraudulent transaction. In one embodiment, such weighting involves identifying orders that are actually consummated and that result in actual charge-backs to the issuing bank associated with the credit card that is identified in the order. The methodology generally ignores orders that are rejected by the fraud screening system disclosed herein as part of the transaction present tests 510.

Figure 9:
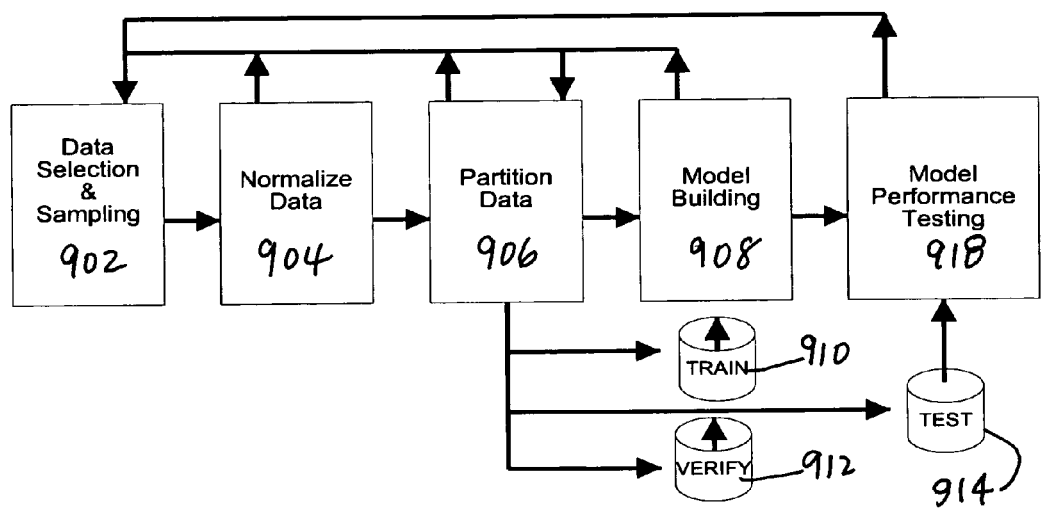
FIG. 9 is a block diagram of a statistical modeling process.

FIG. 9 is a block diagram of a statistical modeling process. In one embodiment, statistical modeling consists of a data selection and sampling phase 902, data normalization phase 904, data partitioning phase 906, model training phase 910, model verification phase 912, and model performance testing phase 918. Many of these phases can participate contribute feedback to earlier phases, as indicated by paths in FIG. 9.

Data Selection and Sampling

In general, the phase 902 of statistical modeling process consists of data selection and sampling. The word "data", in this context, refers to truth-marked transaction data. "Truth-marked" means that the transaction records include a field indicating the final outcome of the transaction—whether the transaction ultimately resulted in an adverse outcome such as chargeback or suspicious credit back, or the transaction resulted in a good sale. During this phase the sources of truth-marked modeling data are selected. If the model is to provide custom protection to a single merchant, then data specific to that merchant would dominate but the modeling set might also contain representative data from similar merchants as well to broaden the modeling basis. If the model were to serve an entire industry sector then the data would be chosen broadly to represent the sector merchants. However broad the applicability of the model, the data selection is equally broad.

However, this transaction data is not used for statistical modeling as-is; it is down-sampled. Down-sampling is a statistical process by which the modeler achieves an optimal balance between high-risk and low-risk transactions in the modeling set through biased random sampling. The modeler establishes the optimal mix proportions based on theoretical characteristics of the model that is to be built. For example, in many cases, high-risk transactions are rare in relation to low-risk. If the selected data is used for modeling as-is, the low-risk transactions could dominate and drown out the signal from the infrequent high-risk items. A balance is desirable. Typically, a ten-to-one ratio of low-risk to high-risk data items is obtained, by accepting all high-risk items in the selected data set and then randomly down-sampling the low-risk items, to achieve the desired ratio.

Data Normalization

Statistical modeling schemes typically respond best to data that are numerically well-behaved. Since transaction data and test result data can, in principle, contain values from all across the numeric spectrum, the data are normalized by applying the statistical Z-transform, or some other such transform to fit all data values into the range from minus one to plus one, or less optimally from zero to one. This makes the modeling task more stable and the results more robust. These functions are carried out in data normalization phase 904.

Data Partitioning

In data portioning phase 906, the selected and sampled data is broken down into three partitions or mutually exclusive data sets: the training set, the verification set, and the testing set. Although there is no required proportion for these data sets, proportions such as 50-50 and 60-40 are commonly used. For example, using the 60-40 proportion, 60 percent of the modeling data is randomly chosen for training and validation, and the remaining 40 percent is held aside or held back as testing data for the model testing phase. The 60 percent chosen for model building is further broken down according to another rule of thumb such as 65-35 into training data and validation data, both of which participate in a model building phase 908. All partitioning is done using pseudo-random number generation algorithms.

Model Training

Once the modeling data are selected, sampled, and normalized, model training phase 910 is carried out. The first step is to select or create an initial candidate model architecture. For non-linear statistical models such as neural networks and basis function networks, this involves configuring the input layer to conform to the dimensionality of the modeling data feature set, configuring the output layer to conform to the demands of the model domain, and to then select an initial number of "hidden units" or "basis function units". If the demands of the model domain are to simply make a simple numeric estimation of the transaction risk then a single unit output architecture is chosen. If the modeling domain demands that the transaction be categorized into multiple risk type estimates, then the output layer is made to conform to the dimensionality of the target category set.

With each successive training cycle, the model is exposed to the training data one transaction at a time and allowed to self-adjust the model weights attempting to achieve a "best balance" in the face of the entire data set—a balance between correct risk estimation for the low-risk transactions and correct risk estimation for the high-risk transactions. The training cycle is terminated when the rate of successful weight adjustment, as measured by successive improvements in mean square error, begins to asymptote or flatten out. Training beyond that point may result in "over-fit" where the model becomes so specifically conditioned to the training data that later, in the performance testing phase, it will fail to generalize to previously unseen but similar patterns of data. If the model fails to train to criteria, then the modeler returns to one of the previous steps and enters the modeling cycle again, adjusting to prevent the modeling failure on the next cycle. The most common step for modeling entry is to return to the beginning of the model training phase and make adjustments to the architecture although it is not uncommon to go back to the data selection and sampling phase if necessary.

Model Verification

The model-in-training or the completely trained model both are subjected to verification in model verification phase 912. During this phase the behavior of the model is checked against common sense criteria by bringing some of the verification data to bear on the model. In a way this is an interim form of performance testing. The difference is that, once adjustments are made to the model, the verification data that was used to determine the nature of the required model change becomes part of the ongoing training set. Typically, after a cycle of verification reveals some model weakness, the modeling process is re-entered at one of the earlier stages. This cycling between model training phase 910, model verification phase 912, model adjustment, and model re-training concludes the general model building phase 908.

Model Testing

Once model building cycles have completed, the finished model is subjected to model performance testing in testing phase 918. The 40-50 percent of the original selected and sampled data that was held back for performance testing is now brought to bear. The model has never been exposed to this transaction data before. The model scores all of the remaining data, without allowing any modifications to be made to its weights or architecture. The results of scoring are analyzed. If the model has performed to criteria, modeling is completed and the statistical model is ready for deployment in the production fraud risk estimation system where it will be exposed to transactions as they are presented to the system in real time and produce a numeric risk estimate for each transaction. That numeric risk estimate can be interpreted as fraud likelihood, the likelihood that the transaction will turn out to be bad.

If the model does not perform to criteria, the modeling process begins again from the beginning with a new data selection and sampling cycle, as shown in FIG. 9.

INPUT: Merchant Data
1. Select and Down-Sample Data
2. Compute Discrete Scores and Normalize
3. Partition Data into Train, Verify, and Test Sets
4. Build Model
5. Test Model Performance
6. Deploy Model in Production Environment
7. Analyze Runtime Performance of Model
OUTPUT: Statistical Model Risk Estimate Heuristic Model Heuristic Model 550 is comprised one or more artificial intelligence computations that compute a weighted sum based on a linear combination of the discrete scores. The heuristic computations are performed on the results of the heuristic tests. This is a highly complex scoring process that occurs in stages and results in a single numeric estimation of risk. This risk estimate then serves as the basis for Score Blending Process 552, establishing the Risk Zones that structure the blending process. This blending process will be discussed in detail in the appropriate section.

Initially, a total raw score is computed as the weighted sum of the discrete test results. Discrete test results are of four types: Boolean, quantitative, categorical, and probabilistic. Boolean true-false results are valued at zero or one. Quantitative results are valued as positive integers reflecting arithmetic counts of occurrence. Categorical results indicate levels of severity. And probabilistic results indicate levels of confidence. Each discrete test result is multiplied by its associated penalty and these products are summed together to produce the total raw score. The penalty associated with each test can be negative or positive. Negative penalties reduce the likelihood of risk and positive penalties increase the risk likelihood. The resulting total raw score indicates the face value and situational risk of the transaction.

Next, the heuristic model computes a raw score multiplier. The raw score multiplier is similar to a "gain control" device. The raw score is boosted upward based on a combination of certain test results and the merchant's declared policy toward those test results. If the merchant has indicated a special interest in a particular test, then the results of that test are magnified to boost the score upward or downward—mostly upward. Based on the merchant preferences for specified tests, and on those test results, a score multiplier is computed and applied to the total raw score resulting in a "classic" score. The resulting classic score ranges in value from 0 to a very large number which can be greater than 100, 000 and in its upper ranges appears to be distributed exponentially.

Finally, the classic score is scaled and transformed into a linear estimate of the likelihood of transaction risk. This Heuristic Model score ranges from 0 to 99 and is an estimate of risk likelihood. This heuristic estimate is later combined with the results of other models through a process of numeric fusion described in a later section of this document.

INPUT: Discrete Scores
8. Compute Raw Score
9. Compute Score Multiplier
10. Compute Classic Score
11. Scale to Appropriate Range
OUTPUT: Heuristic Model Risk Estimate Risk Estimate Blending The risk likelihood estimates deriving from Heuristics 550 and Statistical Models 540 are blended or fused to produce a final comprehensive estimate of the likelihood of risk associated with the transaction-merchant-card-fraudster combination. This is commonly called the Fraud Score, but here will be called the Risk Estimate. The blending takes place against the backdrop of the basic statistical dilemma faced by all discrete decision systems. This situation is illustrated in FIG. 10.

Figure 10:
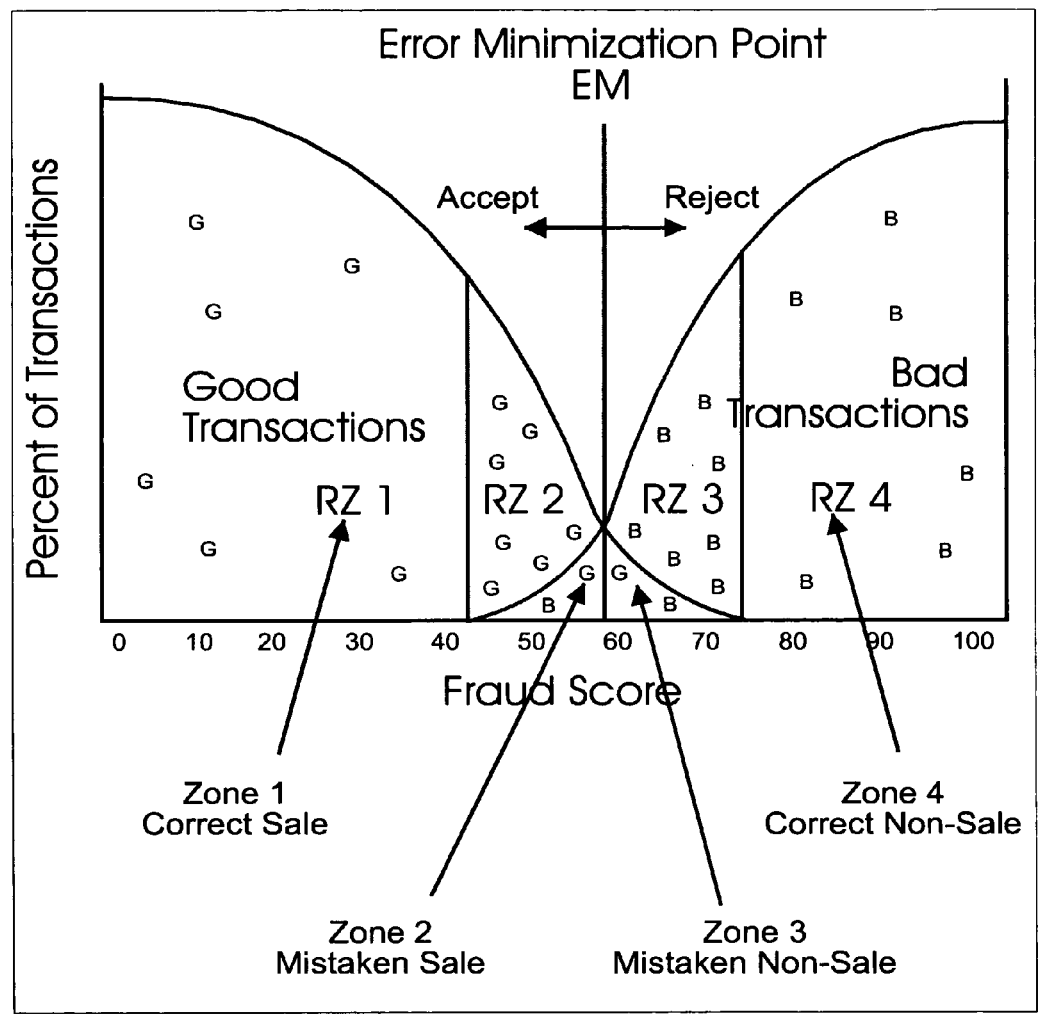
FIG. 10 is a diagram of a risk estimate blending process.

FIG. 10 shows two frequency distributions: the score distribution of Good Transactions and that of Bad Transactions. By overlaying the distribution of Risk Estimates observed for truly bad transactions on the distribution of truly good transactions, four Risk Zones are established. Risk Zone 1 begins at the lowest risk likelihood (Risk Score 0) and extends to the point where the occurrence of fraud transactions becomes non-trivial. Risk Zone 1 contains low-scoring transactions that are highly unlikely to be fraudulent.

Referring again to FIG. 10, Risk Zone 2 begins in the general non-fraud zone at the point where the occurrence of fraud transactions becomes non-trivial and extends to the point where the Good Transactions frequency surface and the Bad Transactions frequency surface intersect. That boundary is also defined as Error Minimization point (EM), the point that balances the risk of Type I and Type II Error and is often recommended as a default discrete decision threshold. Risk Zone 2 contains mostly non-fraudulent transactions but also a mix of mid-low scoring fraudulent transactions. Type II Errors (also known as Misses, Missed Detections, and Mistaken Sales) occur when fraudulent transactions score in Risk Zones 1 and 2 and are thus mistakenly accepted for processing.

Risk Zone 3 of FIG. 10 begins at the default Error Minimization point and extends to the point in the general fraud zone where the occurrence of non-fraudulent transactions becomes trivial. Risk Zone 3 contains mostly fraudulent transactions but also a mix of mid-high scoring non-fraudulent transactions. Risk Zone 4 begins at the point where the occurrence of mid-high scoring non-frauds becomes trivial and extends to the top of the scoring range. Risk Zone 4 contains high-scoring transactions that are extremely likely to be fraudulent. Type I Errors (also known as False Alarms, False Positives, and Mistaken Non-Sales) occur when non-fraudulent transactions score in Risk Zones 3 and 4 and are thus mistakenly rejected from processing.

The score value (Risk Estimate) of Statistical Model 540 and the Heuristic Score Risk Estimate of Heuristic Model 550 are blended in Score Blending Process 552 as follows. For each of the four Risk Zones, a blending policy is established and enforced dictating the magnitude and the allowable direction of influence the models are permitted. The policies are a function of both 1) The nature of the risk estimation algorithms yielding the scores being blended, and 2) The nature of the Risk Zones themselves. In one embodiment, the Heuristic Model is taken as the basic scoring authority for establishing the boundaries of all Risk Zones. In this embodiment, the Statistical Model is intended primarily to protect non-fraudulent transactions from mistakenly receiving a high Risk Estimation (to prevention of False Alarms), and since most non-fraudulent transactions naturally fall in Risk Zones 1 and 2, the Statistical Model is given full responsibility for reducing Risk Estimations in Zone 1 and limited authority to reduce Risk Estimations in Zone 2. Further, in this example embodiment, since the Heuristic Model is intended primarily to optimize the detection of fraudulent transactions (and thus to avoid Misses); and since most fraudulent transactions naturally fall in Zones 3 and 4, that model is given full responsibility for producing Risk Estimates in Zone 4 and primary responsibility for producing Risk Estimates in Risk Zone 3. The Statistical Model is given limited authority to increase Risk Estimates in Zone 3.

If the Heuristic Model Risk Estimate falls in risk Zone 1, the Statistical Model produces the final Risk Estimate. If the Heuristic Model Risk Estimate falls in Risk Zone 4, the Heuristic Model produces the final Risk Estimate. If the Heuristic Model score falls in Zone 2 or Zone 3, a special Limit Surface Logic is applied to minimize either False Alarms or Misses, as the case may be.

Figure 11:
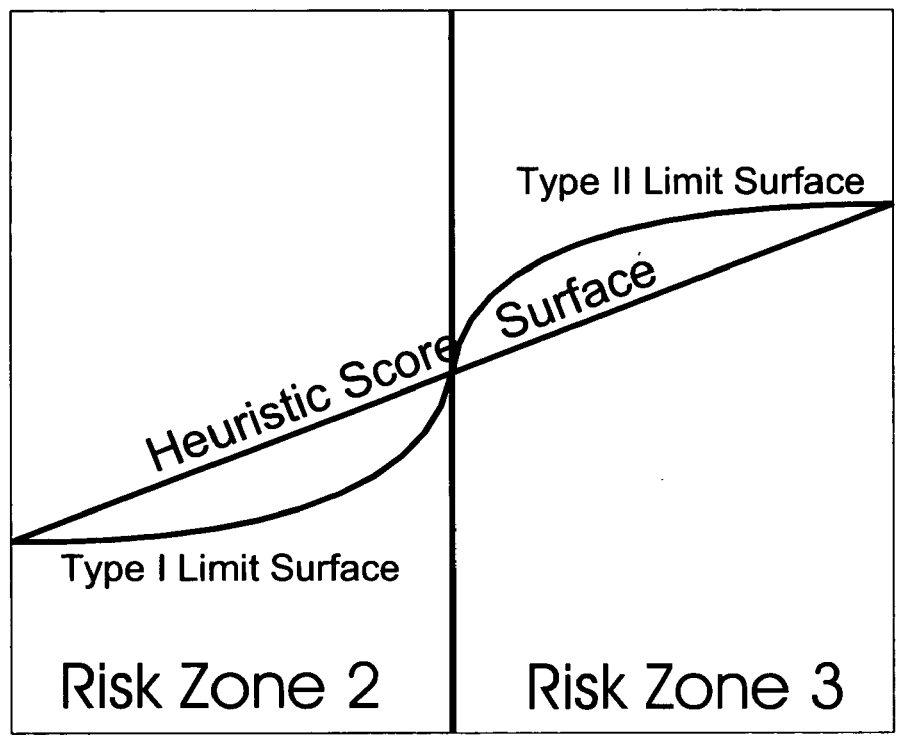
FIG. 11 is a diagram of a limit surface logic process.

Referring now to FIG. 11, a Limit Surface (Type I Limit) is established below the Heuristic Score Surface to help minimize the likelihood of Type I Errors; and a Limit Surface (Type II Limit) is established above the Heuristic Score Surface to help minimize the likelihood of Type II Errors.

If the Heuristic Model Risk Estimate falls in Zone 2 and the Statistical Model Risk Estimate falls between the Type I Limit Surface and the Heuristic Model Surface, the =Statistical Model Risk Estimate is allowed to reduce the final Risk Estimate for the apparently non-fraudulent transaction. Otherwise the Heuristic Model produces the final Risk Estimate.

If the Heuristic Model Score falls in Zone 3 and the Statistical Model Score falls between the Type II Limit Surface and the Heuristic Model Surface, the Statistical Model Score is allowed to increase the final Risk Estimate. Otherwise, the Heuristic Model produces the final Risk Estimate.

In general, the contribution of parallel models to the final Risk Estimate is determined during blending by considering the strengths and weaknesses of each to-be-blended model in light of the distribution characteristics of the various Risk Zones.

Hardware Overview

Figure 8:
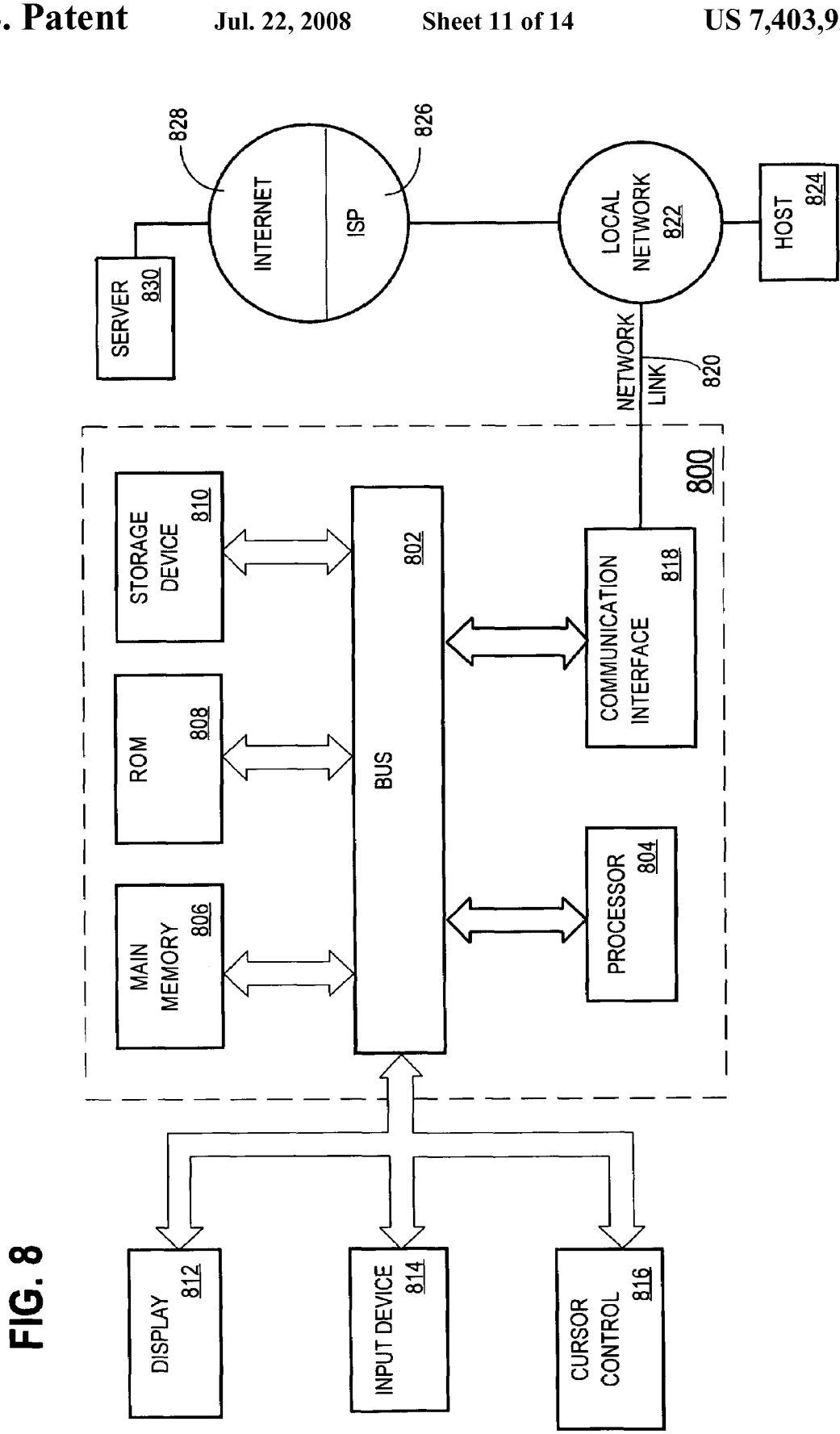
FIG. 8 is a block diagram that illustrates a computer system upon which an embodiment may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory ("RAM") or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory ("ROM") 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube ("CRT"), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for evaluating fraud risk of an electronic commerce transaction. According to one embodiment of the invention, evaluating fraud risk of an electronic commerce transaction is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector can receive the data carried in the infrared signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network ("ISDN") card or a modem to provide a data communication connection to a corresponding type of telephone line. As another example, communication interface 818 may be a local area network ("LAN") card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider ("ISP") 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for analyzing a Layer 2 path in a switched network as described herein.

The received code may be executed by processor 804 as it is received, and/or stored in storage device 810, or other non-volatile storage for later execution. In this manner, computer system 800 may obtain application code in the form of a carrier wave.

Alternatives and Variations

Accordingly, a computer-based processing method for evaluating fraud risk associated with an electronic commerce transaction has been described. In the embodiments disclosed herein, such a processing method provides for identifying transactions that are =likely to be fraudulent, while limiting false positive results and limiting false negative results.

Use of the system disclosed herein, in conjunction with credit card authorization and AVS, can enhance bottom line business performance by maximizing the number of valid orders that are converted to sales and minimizing fraud risk. Although use of card authorization and AVS are not required within the scope of the invention, merchants who use AVS and accept only those orders where AVS=MATCH will find use of the system disclosed herein enables a higher level of sales conversion with a lower incidence of fraud. Similarly, merchants who accept all authorized orders except those having AVS=NON-MATCH will continue to enjoy a high level of sales conversion along with a reduction in fraudulent transactions with the system disclosed herein.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. The legal scope of the invention is specified by the claims herein.

What is claimed is:

1. A method of evaluating fraud risk of an electronic commerce transaction, the method comprising the computer-implemented steps of:

receiving transaction data that defines the electronic commerce transaction;

determining a first fraud risk score value associated with the electronic commerce transaction based on applying a plurality of tests to the transaction data, wherein each of the plurality of tests determines whether the transaction data appears to represent a genuine transaction based on specified criteria;

determining a second fraud risk score value associated with the electronic commerce transaction based on a comparison of the transaction data to historical transaction data;

combining the first fraud risk score value and the second fraud risk score value using a statistical model to result in creating a model score value; and blending the model score value with one or more merchant-specific threshold values to result in creating and storing a final fraud risk score value for the electronic commerce transaction;

wherein receiving transaction data comprises the steps of receiving transaction data that defines the electronic commerce transaction for a particular Internet identity, and wherein determining a second fraud risk score value comprises the steps of determining a second fraud risk score value associated with the electronic commerce transaction based on a comparison of the transaction data to historical transaction data for other electronic commerce transactions pertaining to the same Internet identity;

wherein the particular Internet identity comprises a first hash value of an email address of a prospective purchaser carried in combination with a second hash value of a card bank identification number of the prospective purchaser; and wherein the step of blending the model score value comprises the steps of:
  determining in which fraud risk zone, of two or more fraud risk zones, the boundaries of which are determined by the one or more merchant-specific threshold values, the model score value belongs; and
  applying a policy corresponding to the determined fraud risk zone, wherein the policy dictates a magnitude and an allowable direction of influence applied by a heuristic model and a statistical model.

2. A method as recited in claim 1, wherein the particular Internet identity comprises a first hash value of an email address of a prospective purchaser carried in combination with a second hash value of a card bank identification number of the prospective purchaser and with a third hash value based on a shipping address of the prospective purchaser.

3. A method as recited in claim 1, wherein the particular Internet identity comprises a first hash value of an prospective purchaser's host IP address, in combination with a second hash value of an email address of a prospective purchaser carried, in combination with a third hash value of a card bank identification number of the prospective purchaser and a fourth hash value based on a shipping address of the prospective purchaser.

4. A method as recited in claim 1, wherein the particular Internet identity comprises a first hash value of a prospective purchaser's hardware device ID value, in combination with a second hash value of either the email address or user ID of the prospective purchaser, in combination with a third hash value of a card bank identification number of the prospective purchaser and with a fourth hash value based on a shipping address of the prospective purchaser.

5. A method as recited in claim 1, wherein the step of determining the second fraud risk score value comprises the steps of:
  retrieving one or more records of historic transaction data pertaining to past transactions associated with the transaction data;
  when one of the records of historic transaction data is found to contain a fraud list tag, discontinuing further retrieval of such records;
  determining the second fraud risk score value associated with the electronic commerce transaction based on only the retrieved records of historical transaction data in comparison to the transaction data.

6. A method as recited in claim 1, wherein the step of determining the second fraud risk score value comprises the steps of:
  retrieving one or more records of historic transaction data pertaining to past electronic commerce transactions associated with the transaction data;
  when a specified amount of the records of historic transaction data is retrieved and further records of historic transaction data remain to be retrieved, discontinuing further retrieval of such records;
  determining the second fraud risk score value associated with the electronic commerce transaction based on only the retrieved records of historical transaction data in comparison to the transaction data.

7. The method as recited in claim 1, wherein the step of blending the model score value comprises the steps of blending the model score value with one or more merchant-specific threshold values to result in creating and storing a final fraud risk score value for the electronic commerce transaction and one or more return code values that signal specified risk issues that have been detected with respect to the transaction.

8. The method as recited in claim 1, wherein determining the first fraud risk score value comprises the steps of determining a first fraud risk score value associated with the electronic commerce transaction based on applying a plurality of tests to the transaction data, wherein one of the plurality of tests determines whether an Internet identity in the transaction data is found in a list of parties to known past fraudulent transactions.

9. The method as recited in claim 1, wherein determining the first fraud risk score value comprises the steps of determining a first fraud risk score value associated with the electronic commerce transaction based on applying a plurality of tests to the transaction data, wherein one of the plurality of tests determines whether an Internet identity in the transaction data is found in a list of trusted parties.

10. A method as recited in claim 1, wherein determining the first fraud risk score value comprises the steps of determining a first fraud risk score value associated with the electronic commerce transaction based on applying a plurality of tests to the transaction data, wherein one of the plurality of tests comprises the steps of:
  receiving the text value;
  for each bi-gram in the text value, retrieving from a table of bi-gram probability values a probability value that represents a probability that the bi-gram is found in a genuine text value;
  generating a penalty value when the retrieved probability values indicate that the text value comprises a combination of bi-grams that are not likely to represent a genuine text value.

11. A method as recited in claim 1, wherein determining the first fraud risk score value comprises the steps of determining a first fraud risk score value associated with the electronic commerce transaction based on applying a plurality of tests to the transaction data, by the steps of:
  receiving the name value;
  for each bi-gram in the text value, retrieving from a table of bi-gram probability values a probability value that represents a probability that the bi-gram is found in a genuine name value, wherein the table of bi-gram probability values is created based on an actual frequency of occurrences of bi-grams in a large sample of genuine names;

generating a penalty value when the retrieved probability values indicate that the text value comprises a combination of bi-grams that are not likely to represent a genuine name value.

12. A method as recited in claim 1, wherein determining the first fraud risk score value comprises the steps of determining a first fraud risk score value associated with the electronic commerce transaction based on applying a plurality of tests to the transaction data, wherein one of the plurality of tests automatically determines whether a city value in the transaction data is within an area code value of the transaction data, by the steps of:
receiving the city value and the area code value as part of the transaction data;
determining a latitude value and a longitude value that represent a position of a city identified in the city value;
determining a range of latitude values and a range of longitude values associated with an area code identified in the area code value;
based on the latitude value, the longitude value, the range of latitude values, and the range of longitude values, determining whether the city identified in the city value is within the area code identified in the area code value;
applying a penalty to the electronic commerce transaction when the city identified in the city value is not within the area code identified in the area code value.

13. A method as recited in claim 1, wherein determining the first fraud risk score value comprises the steps of determining a first fraud risk score value associated with the electronic commerce transaction based on applying a plurality of tests to the transaction data, wherein one of the plurality of tests automatically determines whether a city value in the transaction data is within an email domain of the transaction data, by the steps of:
receiving the city value and an email address value as part of transaction data;
determining a latitude value and a longitude value that represent a position of a city identified in the city value;
determining a range of latitude values and a range of longitude values associated with an email domain portion of the email address value;
based on the latitude value, longitude value, the range of latitude values, and the range of longitude values, determining whether the city identified in the city value is within the email domain indicated in the email address value;
applying a penalty to the electronic commerce transaction when the city identified in the city value is not within the area code identified in the area code value.

14. A method as recited in claim 13, further comprising the steps of creating and storing an email domain location table comprising a plurality of records that associate email domain values with city values associated with shipping addresses of past non-fraudulent transactions.

15. The method as recited in claim 14, wherein determining whether the city identified in the city value is within the email domain comprises the steps of determining whether the city value is for a city that is outside the email domain as indicated by the records in the email domain location table.

16. A method as recited in claim 1, wherein determining the first fraud risk score value comprises the steps of determining a first fraud risk score value associated with the electronic commerce transaction based on applying a plurality of tests to the transaction data, wherein one of the plurality of tests automatically determines whether a country value in the transaction data is proximate to a bank referenced in a bank identification number of a credit card number in the transaction data, by the steps of:
receiving the country value and a bank identification number of a credit card number as part of the transaction data;
determining a relative distance between a country identified in the country value and a bank associated with the bank identification number;
based on the relative distance between the country and the bank, determining whether the country is greater than a specified relative distance from the bank;
applying a penalty to the electronic commerce transaction when the country is greater than the specified relative distance from the bank.

17. A method as recited in claim 16, further comprising the steps of creating and storing a bank location table comprising a plurality of records, wherein each record associates a bank identification number with a country value representing a country in which a headquarters of the bank is located.

18. A method as recited in claim 17, further comprising the steps of creating and storing a bank location table comprising a plurality of records that associate bank identification numbers with country values associated with shipping addresses of past non-fraudulent transactions.

19. The method as recited in claim 18, wherein determining whether the country identified in the country value is greater than the specified relative distance from the bank comprises the steps of determining whether the country value is for a country that is greater than the specified relative distance from the bank as indicated by the records in the bank domain location table.

20. A method as recited in claim 1, wherein:
receiving the transaction data is performed by a first apparatus that is linked to a second apparatus by a network; and
blending the model score value is performed by the second apparatus.

21. A computer-readable medium carrying one or more sequences of instructions for evaluating fraud risk of an electronic commerce transaction, which instructions, when executed by one or more processors, cause the one or more processors to carry out the steps of:
receiving transaction information that defines the electronic commerce transaction;
determining a first fraud risk score value associated with the electronic commerce transaction based on applying a plurality of tests to the transaction data, wherein each of the plurality of tests determines whether the transaction data appears to represent a genuine transaction based on specified criteria;
determining a second fraud risk score value associated with the electronic transaction based on a comparison of the transaction information to historical transaction information;
combining the first fraud risk score value and the second fraud risk score value using a statistical model to result in creating a model score value; and
blending the model score value with one or more merchant-specific threshold values to result in creating and storing a final fraud risk score value for the electronic commerce transaction;
wherein receiving transaction data comprises the steps of receiving transaction data that defines the electronic commerce transaction for a particular Internet identity, and wherein determining a second fraud risk score value comprises the steps of determining a second fraud risk score value associated with the electronic commerce transaction based on a comparison of the transaction data to historical transaction data for other electronic commerce transactions pertaining to the same Internet identity;

wherein the particular Internet identity comprises a first hash value of an email address of a prospective purchaser carried in combination with a second hash value of a card bank identification number of the prospective purchaser; and wherein the step of blending the model score value comprises the steps of:

determining in which fraud risk zone, of two or more fraud risk zones, the boundaries of which are determined by the one or more merchant-specific threshold values, the model score value belongs; and applying a policy corresponding to the determined fraud risk zone, wherein the policy dictates a magnitude and an allowable direction of influence applied by a heuristic model and a statistical model.

22. An apparatus for evaluating fraud risk of an electronic commerce transaction, the apparatus comprising:

means for receiving transaction data that defines the electronic commerce transaction;

means for determining a first fraud risk score value associated with the electronic commerce transaction based on applying a plurality of tests to the transaction data, wherein each of the plurality of tests determines whether the transaction data appears to represent a genuine transaction based on specified criteria;

means for determining a second fraud risk score value associated with the electronic commerce transaction based on a comparison of the transaction data to historical transaction data;

means for combining the first fraud risk score value and the second fraud risk score value using a statistical model to result in creating a model score value; and means for blending the model score value with one or more merchant-specific threshold values to result in creating and storing a final fraud risk score value for the electronic commerce transaction;

wherein the means for receiving transaction data comprises means for receiving transaction data that defines the electronic commerce transaction for a particular Internet identity, and wherein the means for determining a second fraud risk score value comprises means for determining a second fraud risk score value associated with the electronic commerce transaction based on a comparison of the transaction data to historical transaction data for other electronic commerce transactions pertaining to the same Internet identity;

wherein the particular Internet identity comprises a first hash value of an email address of a prospective purchaser carried in combination with a second hash value of a card bank identification number of the prospective purchaser; and wherein the means for blending the model score value comprises:

means for determining in which fraud risk zone, of two or more fraud risk zones, the boundaries of which are determined by the one or more merchant-specific threshold values, the model score value belongs; and means for applying a policy corresponding to the determined fraud risk zone, wherein the policy dictates a magnitude and an allowable direction of influence applied by a heuristic model and a statistical model.

23. An apparatus for evaluating fraud risk of an electronic commerce transaction, comprising:

a processor;

a computer readable medium having one or more sequences of instructions stored thereon which, when executed by the processor, cause the processor to carry out the steps of:

receiving transaction data that defines the electronic commerce transaction;

determining a first fraud risk score value associated with the electronic commerce transaction based on applying a plurality of tests to the transaction data, wherein each of the plurality of tests determines whether the transaction data appears to represent a genuine transaction based on specified criteria;

determining a second fraud risk score value associated with the electronic commerce transaction based on a comparison of the transaction data to historical transaction data;

combining the first fraud risk score value and the second fraud risk score value using a statistical model to result in creating a model score value; and blending the model score value with one or more merchant-specific threshold values to result in creating and storing a final fraud risk score value for the electronic commerce transactions wherein receiving transaction data comprises the steps of receiving transaction data that defines the electronic commerce transaction for a particular Internet identity, and wherein determining a second fraud risk score value comprises the steps of determining a second fraud risk score value associated with the electronic commerce transaction based on a comparison of the transaction data to historical transaction data for other electronic commerce transactions pertaining to the same Internet identity;

wherein the particular Internet identity comprises a first hash value of an email address of a prospective purchaser carried in combination with a second hash value of a card bank identification number of the prospective purchaser; and wherein the step of blending the model score value comprises the steps of:

determining in which fraud risk zone, of two or more fraud risk zones, the boundaries of which are determined by the one or more merchant-specific threshold values, the model score value belongs; and applying a policy corresponding to the determined fraud risk zone, wherein the policy dictates a magnitude and an allowable direction of influence applied by a heuristic model and a statistical model.

24. A computer-readable medium carrying one or more sequences of instructions for evaluating fraud risk of an electronic commerce transaction, when executed by one or more processors, the computer readable medium comprising:

memory carrying one or more instructions that cause the one or more processors to carry out the step of receiving transaction information that defines the electronic commerce transaction;

memory carrying one or more instructions that cause the one or more processors to carry out the step of determining a first fraud risk score value associated with the electronic commerce transaction based on applying a plurality of tests to the transaction information, wherein each of the plurality of tests determines whether the transaction information appears to represent a genuine transaction based on specified criteria;

memory carrying instructions one or more instructions that cause the one or more processors to carry out the step of determining a second fraud risk score value associated with the electronic transaction based on a comparison of the transaction information to historical transaction information;

memory carrying one or more instructions that cause the one or more processors to carry out the step of combining the first fraud risk score value and the second fraud risk score value using a statistical model to result in creating a model score value; and memory carrying one or more instructions that cause the one or more processors to carry out the step of blending the model score value with one or more merchant-specific threshold values to result in creating and storing a final fraud risk score value for the electronic commerce transaction;

wherein the instructions that cause receiving transaction data comprises instructions that cause receiving transaction data that defines the electronic commerce transaction for a particular Internet identity, and wherein the instructions that cause determining a second fraud risk score value comprise instructions that cause determining a second fraud risk score value associated with the electronic commerce transaction based on a comparison of the transaction data to historical transaction data for other electronic commerce transactions pertaining to the same Internet identity;

wherein the particular Internet identity comprises a first hash value of an email address of a prospective purchaser carried in combination with a second hash value of a card bank identification number of the prospective purchaser; and wherein the instructions that cause blending the model score value comprise:
- instructions that cause determining in which fraud risk zone, of two or more fraud risk zones, the boundaries of which are determined by the one or more merchant-specific threshold values, the model score value belongs; and
- instructions that cause applying a policy corresponding to the determined fraud risk zone, wherein the policy dictates a magnitude and an allowable direction of influence applied by a heuristic model and a statistical model.

* * * * *